(12) United States Patent
Winter et al.

(10) Patent No.: US 10,793,442 B2
(45) Date of Patent: Oct. 6, 2020

(54) EXFOLIATION OF ZEOLITES IN FUNCTIONALIZED POLYMERS

(71) Applicant: The University of Massachusetts, Boston, MA (US)

(72) Inventors: Horst H. Winter, Amherst, MA (US); Wei Fan, Amherst, MA (US); Vijesh Tanna, Amherst, MA (US); Sanket Sabnis, Amherst, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 16/440,704

(22) Filed: Jun. 13, 2019

(65) Prior Publication Data

US 2019/0382274 A1    Dec. 19, 2019

Related U.S. Application Data

(60) Provisional application No. 62/685,326, filed on Jun. 15, 2018.

(51) Int. Cl.

| | |
|---|---|
| *C01B 39/02* | (2006.01) |
| *C01B 39/48* | (2006.01) |
| *C08L 9/00* | (2006.01) |
| *C08K 3/36* | (2006.01) |
| *C08K 9/04* | (2006.01) |
| *B01J 31/26* | (2006.01) |
| *B01J 37/02* | (2006.01) |

(52) U.S. Cl.
CPC .......... *C01B 39/026* (2013.01); *C01B 39/48* (2013.01); *C08K 3/36* (2013.01); *C08K 9/04* (2013.01); *C08L 9/00* (2013.01); *B01J 31/26* (2013.01); *B01J 37/0215* (2013.01); *B01J 2231/00* (2013.01); *C01P 2002/72* (2013.01); *C01P 2004/03* (2013.01); *C01P 2004/04* (2013.01); *C01P 2004/24* (2013.01); *C08K 2201/011* (2013.01); *C08L 2666/58* (2013.01)

(58) Field of Classification Search
CPC ........ C01B 39/026; C01B 39/48; B01J 31/36; B01J 37/0215; B01J 2231/00; C01P 2002/72; C01P 2004/03; C01P 2004/04; C01P 2004/24; C08L 9/00; C08L 2666/58; C08K 3/36; C08K 9/04; C08K 2201/011

See application file for complete search history.

(56) References Cited

U.S. PATENT DOCUMENTS

| | | | |
|---|---|---|---|
| 8,501,068 B2 * | 8/2013 | Tsapatsis | ................ C01B 32/16 264/233 |
| 10,005,077 B2 * | 6/2018 | Tsapatsis | ............. B01D 53/228 |
| 10,213,748 B2 * | 2/2019 | Tsapatsis | ............. C01B 39/026 |

OTHER PUBLICATIONS

Na et al, "Pillared MFI Zeolite Nanosheets of a Single-Unit-Cell Thickness", J. Am. Chem. Soc. 2010, 132, 4169-4177 (Year: 2010).*

Choi et al, "Stable single-unit-cell nanosheets of zeolite MFI as active and long-lived catalysts", Nature| vol. 461| Sep. 10, 2009 (Year: 2009).*

(Continued)

*Primary Examiner* — David M Brunsman
(74) *Attorney, Agent, or Firm* — Cantor Colburn LLP

(57) ABSTRACT

A method for forming zeolite nanosheets includes forming a mixture including a layered zeolite precursor and a functionalized polymer and exfoliating the layered zeolite precursor to provide the zeolite nanosheets.

21 Claims, 21 Drawing Sheets

(56) References Cited

OTHER PUBLICATIONS

Argrawal et al, "Solution-Processable Exfoliated Zeolite Nanosheets Purified by Density Gradient Centrifugation", Sep. 2013 vol. 59, No. 9 AlChE Journal (Year: 2013).*

Varoon et al, "Dispersible Exfoliated Zeolite Nanosheets and Their Application as a Selective Membrane", Science 334 (6052), 72-75 (Year: 2011).*

Masheshwari et al, "Layer Structure Preservation during Swelling, Pillaring, and Exfoliation of a Zeolite Precursor" J. Am. Chem. Soc. 2008, 130, 1507-1516 (Year: 2008).*

* cited by examiner

US 10,793,442 B2

EXFOLIATION OF ZEOLITES IN FUNCTIONALIZED POLYMERS

CROSS REFERENCE TO RELATED APPLICATIONS

This application is a Non-Provisional application which claims the benefit of U.S. Provisional Application No. 62/685,326, filed Jun. 15, 2018, which is incorporated by reference in its entirety herein.

STATEMENT REGARDING FEDERALLY SPONSORED RESEARCH OR DEVELOPMENT

This invention was made with government support under Grant No. DE-SC0001004 awarded by the Department of Energy and Grant No. CMMI-1334460 awarded by the National Science Foundation. The government has certain rights in the invention.

BACKGROUND

Zeolites are crystalline aluminosilicate porous materials including silica with other elements, including covalently bonded open frameworks extending in three dimensions. Due to the controllable microporous structures of zeolite, tunable active sites and outstanding stability, zeolites have been widely used in catalysis and separation processes. Two-dimensional zeolites (2DZs) are porous materials with the framework propagating only in two dimensions. 2DZs, with a high external surface area and short diffusion length, may be used in high-throughput separation membranes and catalytic reactions involving bulky molecules.

2DZs can be synthesized from layered zeolite precursors with a controllable porous structure and thickness using swelling, pillaring methods, and exfoliation. The corresponding two-dimensional (2D) zeolite nanosheets of MFI and MWW frameworks have pores perpendicularly running through the sheets. The 2D zeolite nanosheets of an MFI framework have 10 membered-ring (MR) pores, around 0.5 nanometers (nm), in the normal direction and, thus, may act as a molecular sieve, for example, for xylene isomer separation. The 2D zeolite nanosheets of an MWW framework have an external surface with 12MR pockets and 6MR transport limiting apertures, around 0.3 nm, and may thus separate, for example, $H_2$ from $CO_2$. ITQ-1 is a pure silica layered precursor with MWW framework and may be used for membrane applications.

Stable self-standing MWW, MFI, and ITQ-1 nanosheets with a microporous structure may be produced by melt blending of layered zeolite precursors with polystyrene in a twin-screw extruder. The extrusion process occurs at temperatures above the transition temperature of polystyrene. Extrusion provides a force which may lead to exfoliation of layered zeolite precursors. Such melt-blending may require high temperature operation (150° C. to 200° C.), provide low yield, and have the potential for damaging the structure of the zeolite nanosheets through high energy input. Therefore, a facile, efficient, and scalable method for exfoliation of layered zeolite precursors into zeolite nanosheets at a mild temperature, for example, less than 100° C. or at room temperature, is highly desired.

SUMMARY

Provided is a method for forming zeolite nanosheets, the method including forming a mixture including a layered zeolite precursor and a functionalized polymer and exfoliating the layered zeolite precursor to provide the zeolite nanosheets The above described and other features are exemplified by the following figures and detailed description.

BRIEF DESCRIPTION OF THE DRAWINGS

The above described and other features are exemplified by the following figures and detailed description.

FIG. 16 shows (a) SAXS profiles of ITQ-1(P), swollen ITQ-1 (ITQ-1(S)), and a ITQ-1(S)/HTPB mixture after 1 minute of limited mixing, (b) a TEM image of ITQ-1 nanosheets, (c) AFM (tapping mode) topographic image of ITQ-1 nanosheets supported on a mica-disc, and (d) line profile analysis of the topographic height along the line scan of the ITQ-1 nanosheet shown in (c);

Figure 17:
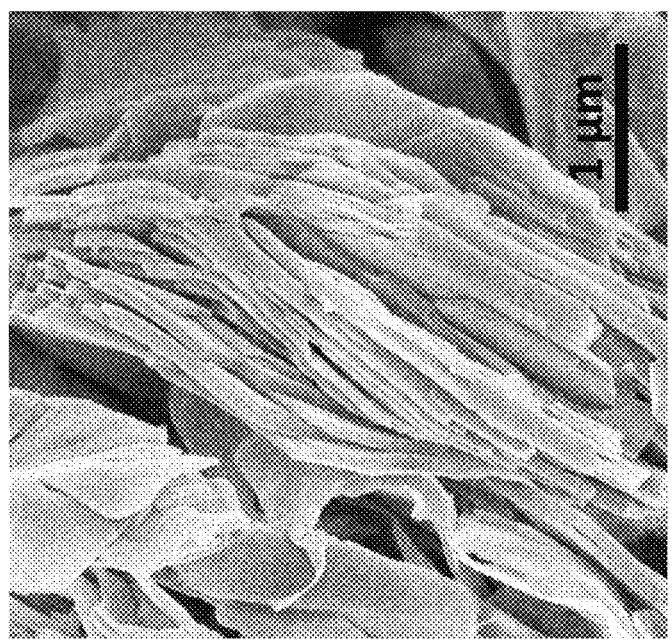
Figure 18:
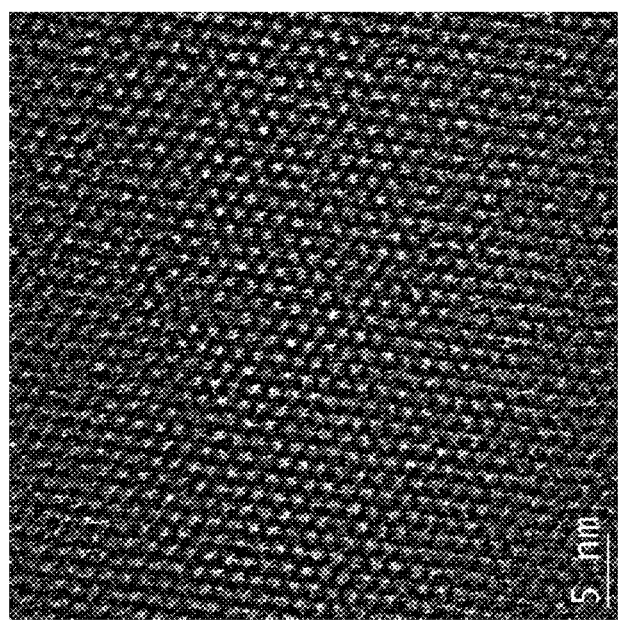
Figure 19:
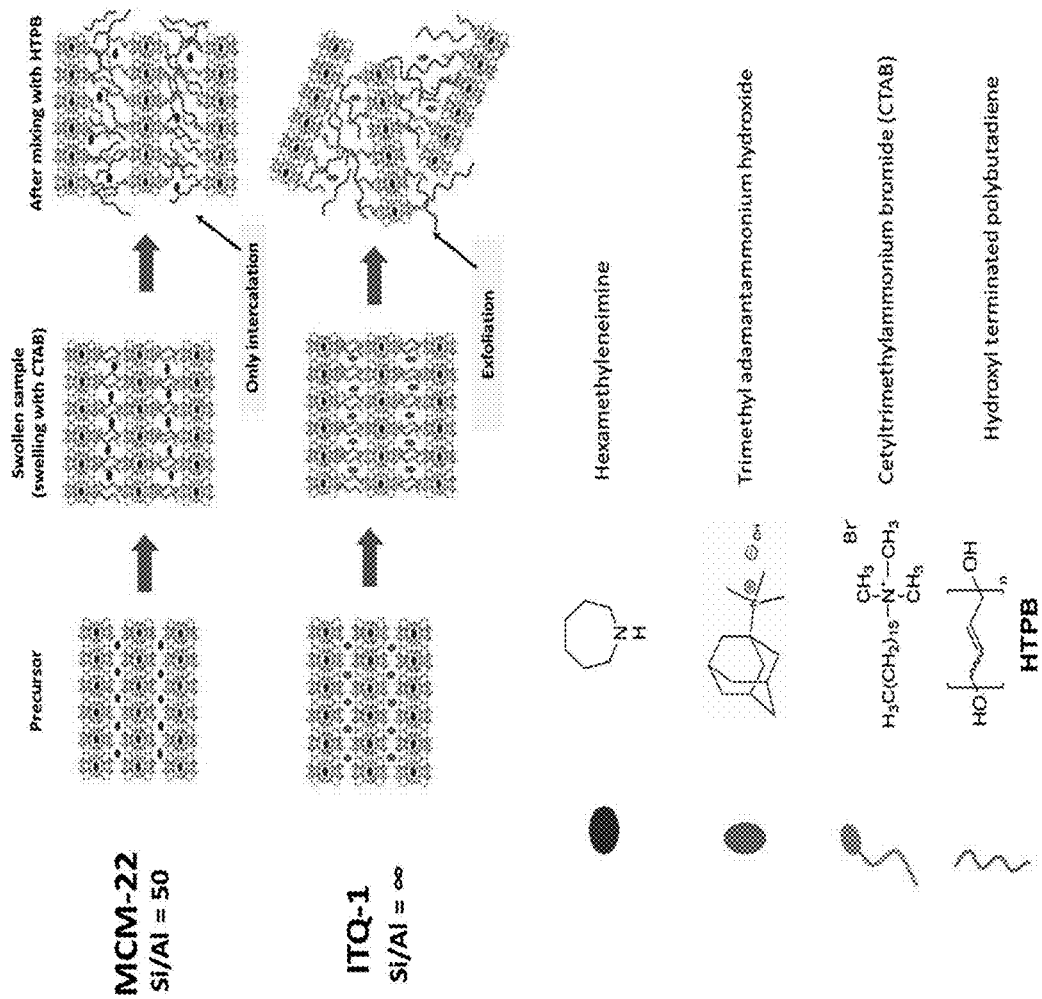
Figure 20:
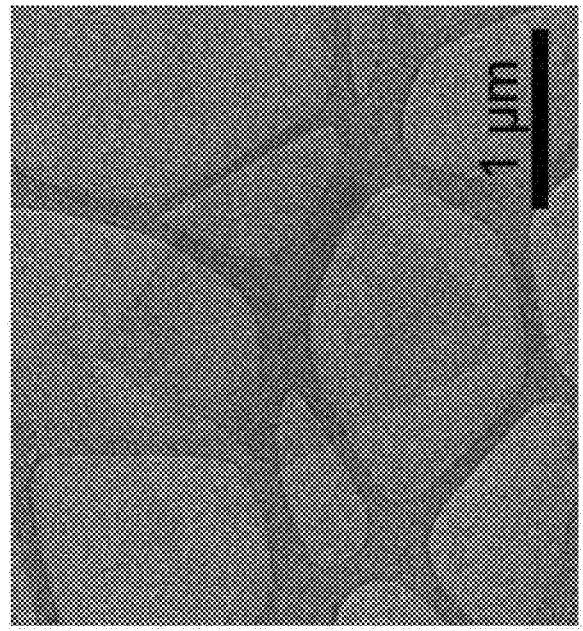
Figure 20:
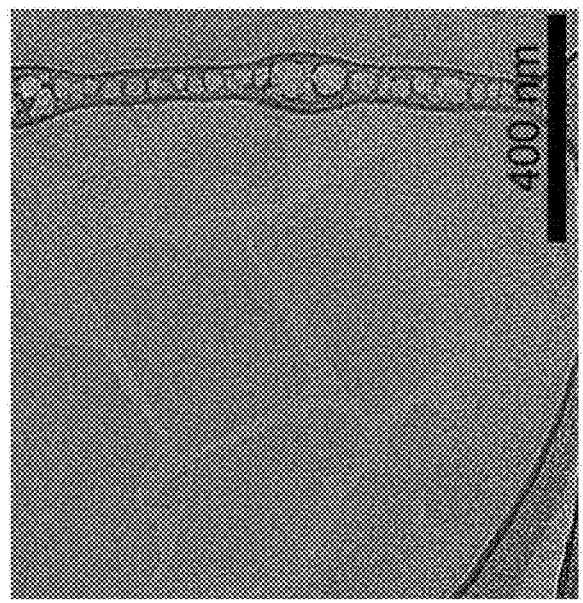
Figure 21:
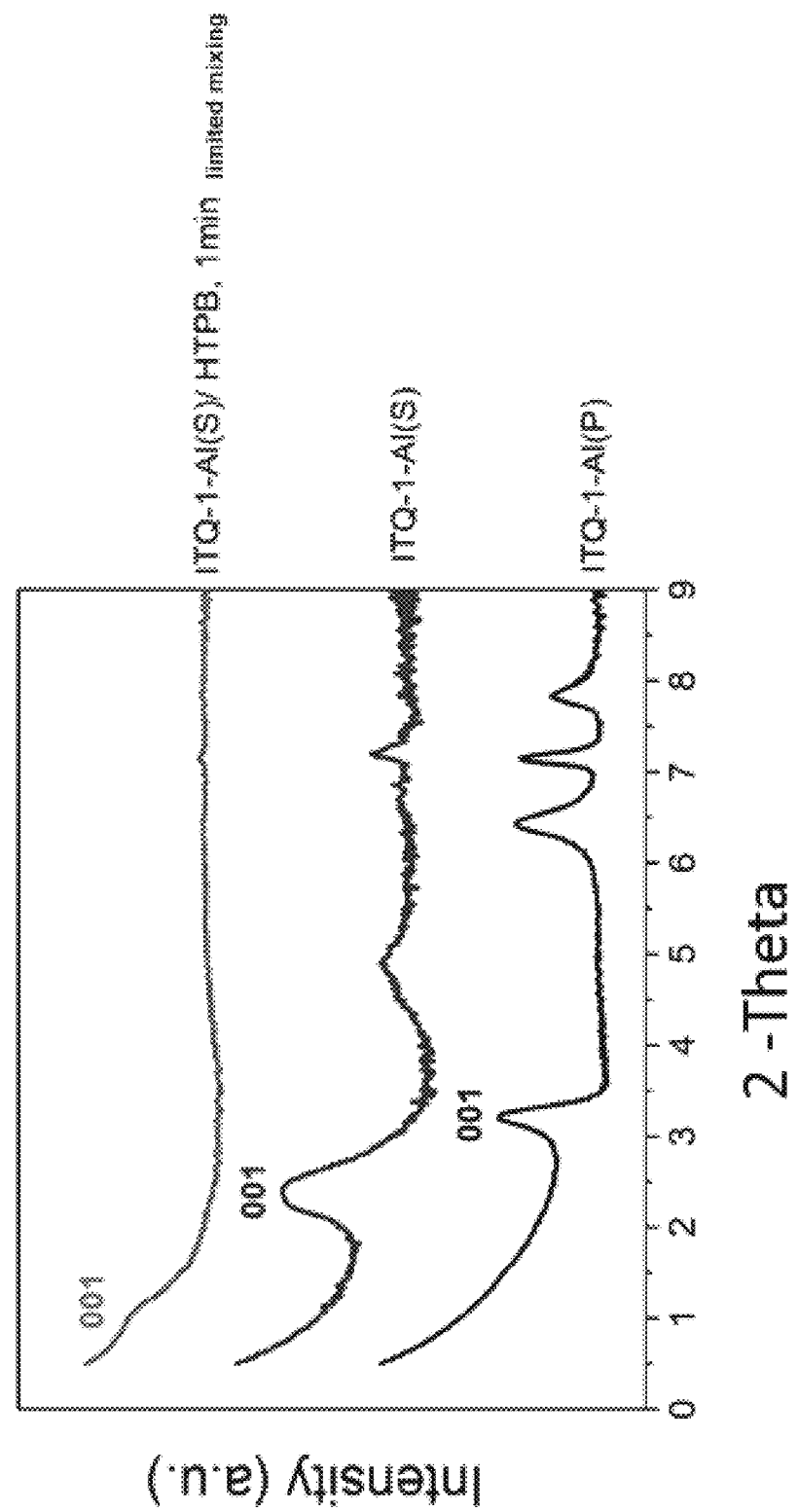

FIG. 17 shows an SEM image of ITQ-1(S);

FIG. 18 shows a High Resolution Transmission Electron Microscopy (HRTEM) image of a ITQ-1 nanosheet;

FIG. 19 shows a difference in exfoliation behavior between MCM-22 and ITQ-1;

FIG. 20 shows SEM images of nanosheets obtained by exfoliation of (a) MCM-22(S) and (b) ITQ-1(S); and FIG. 21 shows SAXS profiles of ITQ-1-Al(P), ITQ-1-Al (S), ITQ-1-Al(S)/HTPB mixture after 1 minute of limited mixing.

DETAILED DESCRIPTION

Zeolite nanosheets may be formed by suspending a layered zeolite precursor in a functionalized polymer, for example, a telechelic polybutadiene, and exfoliating the layered zeolite precursor to provide the zeolite nanosheets. The exfoliated zeolite nanosheets may be transferred into another fluid to form a stable mixture, from which zeolite membranes, composite materials, and hierarchical zeolites may be fabricated.

A facile, efficient, and scalable method for exfoliation of layered zeolite precursors into zeolite nanosheets at a mild temperature, for example, less than 100° C. or at room temperature, is achieved by using a low viscosity fluid rather than a high viscosity polymer melt.

Zeolite

The layered zeolite to be exfoliated may be MCM-22, multilamellar MFI, or ITQ-1. In an embodiment, the layered zeolite may be MCM-49. In an embodiment, the layered zeolite may be SSZ-25 or SSZ-70. In an embodiment, the layered zeolite may be CDO, MWW, FER, HEU, CAS, STI, PCR, RWR, RRO, AFO, NSI, OKO, MTF, MFI, or SOD. In an embodiment, the layered zeolite may be CGF, UOS, JSW, SBN, GON, BRE, EPI, AEN, USI, ZON, CFI, JRY, AFS, BPH, or STT.

Without wishing to be bound by any theory, it is understood that the composition of the zeolite affects the mechanism of exfoliation of the zeolite. For example, the zeolite may not include aluminum, which may affect the mechanism of exfoliation of a layered zeolite precursor prepared from the zeolite, and the prepared layered zeolite precursor may be exfoliated in a limited mixing process, i.e., without application of a large mixing force.

Zeolite Preparation

The layered zeolite precursor may be prepared with an organic structure directing agent, preferably tetrapropylammonium, 2-ethyl-1,3,4-trimethylimidazolium, trimethyladamantammonium, hexamethyleneimine, hexamethonium, tetrabutylammonium, or a combination thereof, more preferably hexamethyleneimine. In an embodiment, the layered zeolite precursor is prepared with hexamethyleneimine and trimethyladamantammonium hydroxide. Without wishing to be bound by any theory, it is understood that the organic structure directing agent used to prepare the layered zeolite precursor affects the mechanism of exfoliation of the prepared layered zeolite precursor.

Swelling

In an embodiment, the layered zeolite precursor is swelled prior to forming the mixture. Swelling the layered zeolite precursor may include mixing the layered zeolite precursor with a cationic surfactant, preferably an ammonium surfactant of the formula $R_3R'N^+X^-$ wherein each R is independently a $C_{1-4}$ alkyl, R' is a $C_{8-16}$ alkyl or cycloalkyl, and X is a counterion, more preferably cetyltrimethyl ammonium bromide.

In an embodiment, the cationic surfactant may include behentrimonium chloride, benzalkonium chloride, benzethonium chloride, benzododecinium bromide, bronidox, carbethopendecinium bromide, cetalkonium chloride, cetrimonium bromide, cetrimonium chloride, cetylpyridinium chloride, didecyldimethylammonium chloride, dimethyldioctadecylammonium bromide, dimethyldioctadecylammonium chloride, domiphen bromide, lauryl methyl gluceth-10 hydroxypropyl dimonium chloride, octenidine dihydrochloride, olaflur, N-oleyl-1,3-propanediamine, pahutoxin, stearalkonium chloride, thonzonium bromide, or a combination thereof.

Functionalized Polymer

Exemplary functionalized polymers include hemitelic polymers, di-end-functional polymers, telechelic polymers, random polymers, block polymers, or a combination thereof. In an embodiment, the functionalized polymer may be a functionalized polybutadiene, such as a telechelic polybutadiene, or an end-functionalized polymer other than a polybutadiene. One or more functional groups may be present along the backbone of the polymer, at one or more ends of the polymer, or on polymer side chains (i.e., branches). Exemplary functionalized polymers include an amine-terminated polydimethylsiloxane, a hydroxyl-terminated polydimethylsiloxane (for example, including one hydroxyl group), an epoxy-functionalized polybutadiene (for example, an epoxy-functionalized, hydroxyl-terminated polybutadiene), a phenyl-terminated polybutadiene, a dicarboxy-terminated poly(butadiene-co-acrylonitrile), an amine-terminated polyethylene oxide, and an amine-terminated poly(ethylene glycol).

Without wishing to be bound by any theory, it is understood that the functional group affects the mechanism of exfoliation of the prepared layered zeolite precursor. For example, the polarity of the functional group may affect what zeolites may be exfoliated using a functionalized polybutadiene.

Telechelic Polybutadiene

The telechelic polybutadiene may include hydroxyl-terminated polybutadiene or carboxyl-terminated polybutadiene. In an embodiment, the end group of the telechelic polybutadiene may include a halo, carbonyl, aldehyde, halformyl, ester, methoxy, hydroperoxy, peroxy, ether, hemiacetal, hemiketal, acetal, amide, amine, imine, or imide moiety. In an embodiment, the end group of the telechelic polybutadiene may include a functional group including phosphorus, sulfur, or boron.

As used herein, "amide" means a group of the formula —C(O)—N($R_x$)($R_y$) or —N—C(O)—$R_x$, wherein $R_x$ is an alkyl, an alkenyl, an alkynyl, a cycloalkyl or an aryl group; and $R_y$ is hydrogen or any of the groups listed for $R_x$.

As used herein, "ester" refers to a group of the formula —O(C=O)$R^a$ or a group of the formula —(C=O)O$R^a$ wherein $R^a$ is C1 to C28 aromatic organic group or aliphatic organic group. An ester group includes a C2 to C30 ester group, and specifically a C2 to C18 ester group. A carbonate ester is an example of an ester.

As used herein, "halo" means a group or compound including one more of a fluoro, chloro, bromo, iodo, and astatino substituent. A combination of different halo groups (e.g., bromo and fluoro) can be present.

As used herein, "imide" means a group having two carbonyl groups bound to nitrogen, e.g., succinimide.

In an embodiment, the molecular weight of the telechelic polybutadiene is less than 40,000 g/mol, for example, less 5,000 g/mol. In an embodiment, the viscosity of the telechelic polybutadiene is less than 1,000 Pa·s at 100° C. or less than 10,000 Pa·s at 20° C.

Without wishing to be bound by any theory, it is understood that the end group of the telechelic polybutadiene affects the mechanism of exfoliation of the prepared layered zeolite precursor. For example, the polarity of the functional end group of the telechelic polybutadiene may affect what zeolites may be exfoliated using an end-group functionalized polybutadiene.

Exfoliation

Exfoliating the layered zeolite precursor may include suspension of the layered zeolite precursor in a liquid and applying a dispersion force to the entire soft composite mixture. Such dispersion force may be applied, for example, by limited mixing of the layered zeolite precursors into a polybutadiene (without using additional instrument or using an additional instrument, for example, at a low speed of rotation), extensive mixing (for example, using an additional instrument), and/or sonication. In an embodiment, exfoliation was achieved by extensive mixing, for example, from chaotic flow in a planetary mixer. The dispersion force may be applied to the mixture at a temperature below 100° C., for example, at room temperature.

Application of the dispersion force may include sonication for a period of time less than 300 minutes, for example, less than 100 minutes or less than 30 minutes. Application of the dispersion force may include extensive mixing for a period of time less than 300 minutes, for example, less than 100 minutes or less than 30 minutes. As used herein, the phrase "extensive mixing" refers to a treatment that applies a large dispersion force.

Extensive mixing may reduce the size of the zeolite nanosheets, for example, due to additional forces applied to the zeolite nanosheets. Relatively large exfoliated nanosheets may provide for formation of membranes with fewer grain boundaries and fewer defects. Relatively large exfoliated nanosheets are desirable since they may allow for the fabrication of thin and defect-free high-performance zeolite membranes.

In an embodiment, zeolite precursor, for example, ITQ-1(P), may be exfoliated by limited mixing. As used herein, the phrase "limited mixing" refers to mixing without application of a large dispersion force. In an embodiment, ITQ-1(P) may be exfoliated by limited mixing of ITQ-1(P) with polybutadiene at a temperature below 100° C., for example, at room temperature, and for a period of time less than 5 minutes, for example, less than 3 minutes, for example, a period of time of about 1 minute. Sonication or extensive mixing may be applied with or without an additional operation of limited mixing, for example, before the sonication or extensive mixing.

In an embodiment, the zeolite precursor may be exfoliated to provide two-dimensional zeolite nanosheets. Exfoliated two-dimensional zeolite nanosheets may subsequently stack, for example, during storage, to form multi-layered zeolite nanosheets. In an embodiment, the zeolite precursor may be exfoliated to provide zeolite nanosheets including two or more layers.

As used herein, a two-dimensional zeolite nanosheet refers to a nanosheet having a shape defined by two dimensions. For example, the 2-dimension nanosheet may denote a nanosheet, although it has three dimensions, where lengths of two dimensions are significantly greater than that of the other one dimension, and the whole size of the nanosheet is determined by the lengths of the two dimensions, such as a plate shape.

Examples

MCM-22

Figure 1:
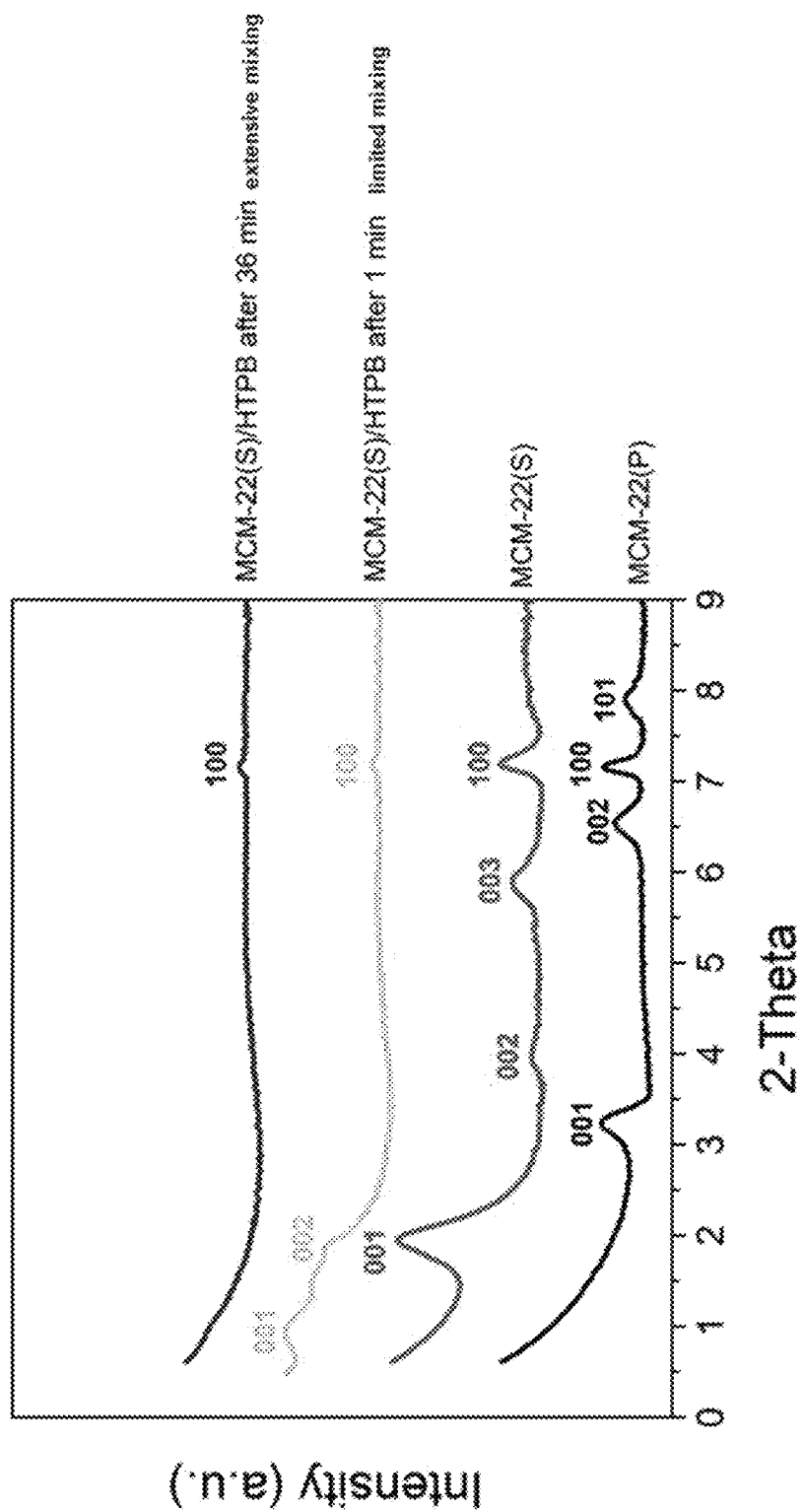
FIG. 1 shows small-angle X-ray scattering (SAXS) profiles of MCM-22 precursor (MCM-22(P)), swollen MCM-22 (MCM-22(S), MCM-22(S)/hydroxyl-terminated polybutadiene (HTPB) mixture after 1 minute of limited mixing at low mixing force, and MCM-22(S)/HTPB mixture after 36 minutes of extensive mixing (i.e., chaotic flow treatment in a planetary mixer)
Figure 2:
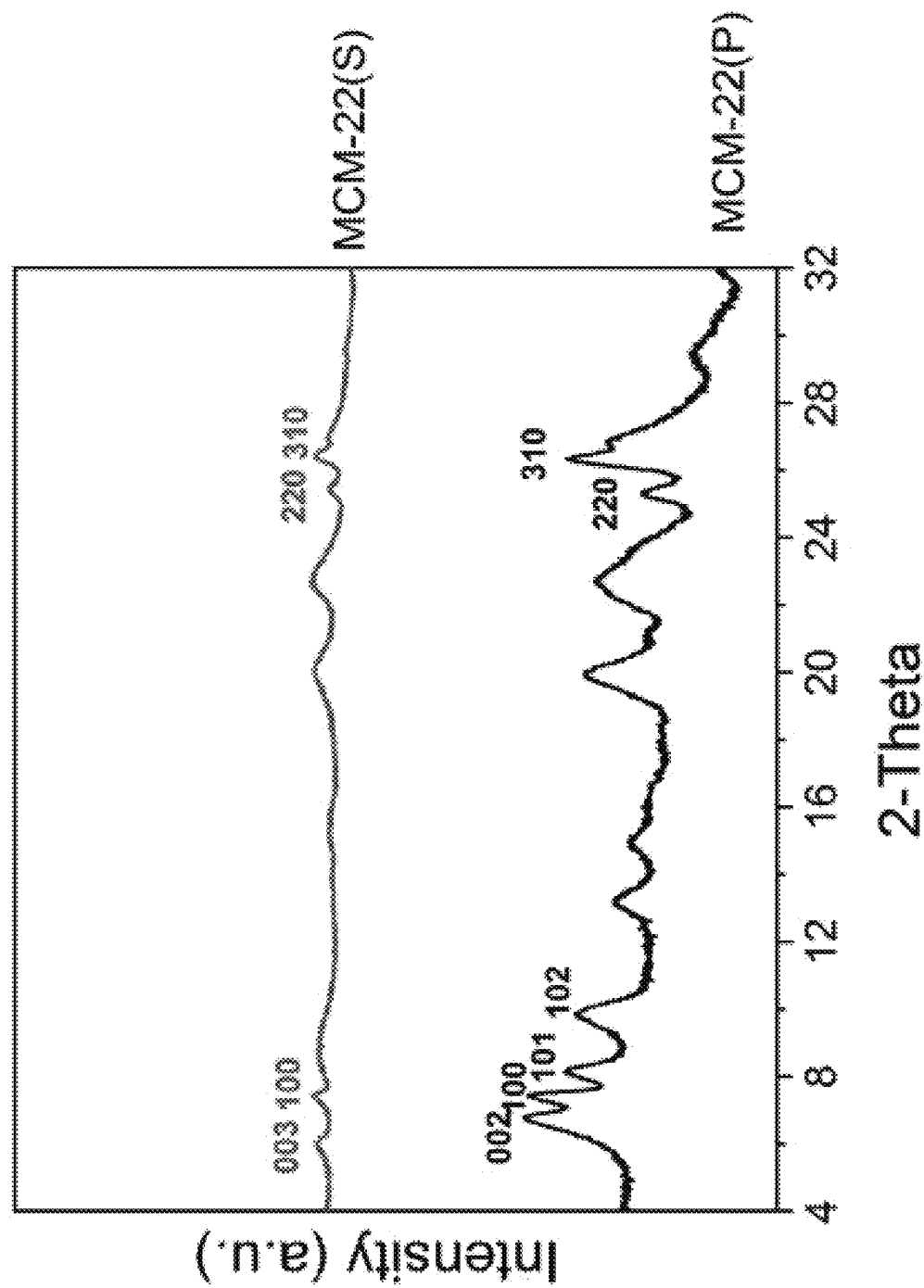
FIG. 2 shows X-ray diffraction (XRD) patterns of MCM-22(P) and MCM-22(S)
Figure 3:
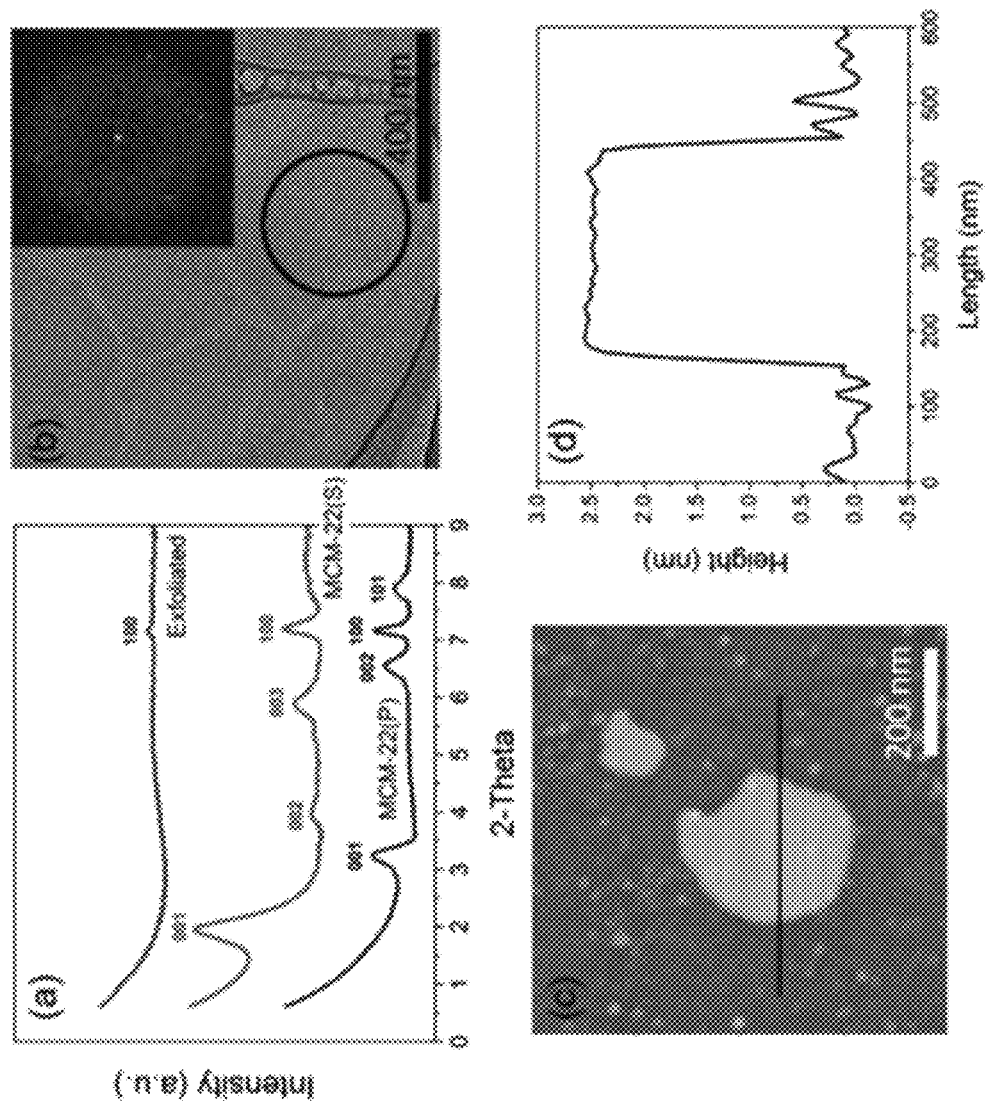
FIG. 3 shows (a) SAXS profiles of MCM-22(P), swollen MCM-22(S), and a MCM-22(S)/HTPB mixture after 36 minutes of extensive mixing, (b) a transmission electron microscopy (TEM) image of zeolite nanosheets obtained and a Fast Fourier Transform (FFT) on the zeolite nanosheet (inset), (c) an atomic force microscopy (AFM) (tapping mode) topographic image of zeolite nanosheets on a mica disc, and (d) line profile analysis of the topographic height along the line scan of the zeolite nanosheet shown in (c)
Figure 4:
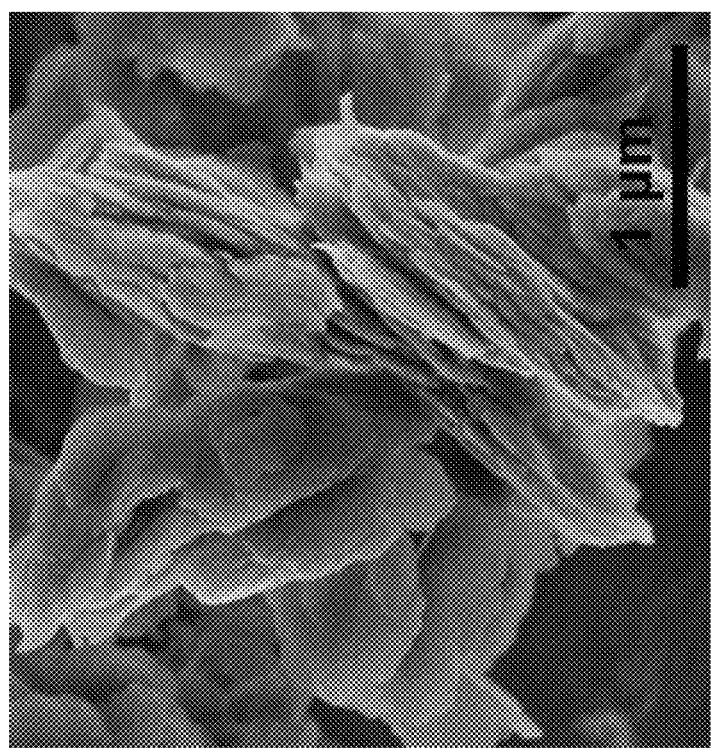
FIG. 4 shows a scanning electron microscope (SEM) image of MCM-22(S) shows the layered structure of the material.

MCM-22(P) with a layered structure was synthesized using hexamethyleneimine (HMI) as a structure-directing agent using a reported method (A. Corma, V. Fornes, S. B. Pergher, T. L. M. Maesen and J. G. Buglass, Nature, 1998, 396, 353). The X-ray diffraction (XRD) pattern of the synthesized sample shows characteristic diffraction peaks of the MWW structure, such as (100), (101), (102), (220), and (310) diffraction peaks, suggesting that highly crystalline MCM-22(P) was obtained using the hydrothermal synthesis method (FIG. 1). The diffraction peaks associated with the crystalline MWW framework remained unchanged during the swelling process as shown in the XRD pattern (FIG. 2), indicating that the crystalline structure of the MCM-22 nanosheets was retained. The SAXS scattering profile of the synthesized MCM-22(P) sample shows (001) and (002) diffraction peaks from a lamellar phase indicating that the material exhibits a layered structure (FIG. 3a). Swollen MCM-22 (MCM-22(S)) was synthesized by swelling MCM-22(P) using cetyltrimethyl ammonium bromide (CTAB) at room temperature using a published method (S. Maheshwari, E. Jordan, S. Kumar, F. S. Bates, R. L. Penn, D. F. Shantz and M. Tsapatsis, J. Am. Chem. Soc., 2008, 130, 1507). The SAXS scattering profile shows a shift of the (001) diffraction peak to a lower angle, indicating that the swelling caused an increase in the interlayer d-spacing to 4.6 nm (FIG. 3a). The shift of the (001) diffraction peak to a lower angle suggests that CTAB molecules diffuse into the MCM-22(P) layers increasing the interlayer spacing. An SEM image of MCM-22(S) also depicts the presence of layers (FIG. 4).

Figure 5:
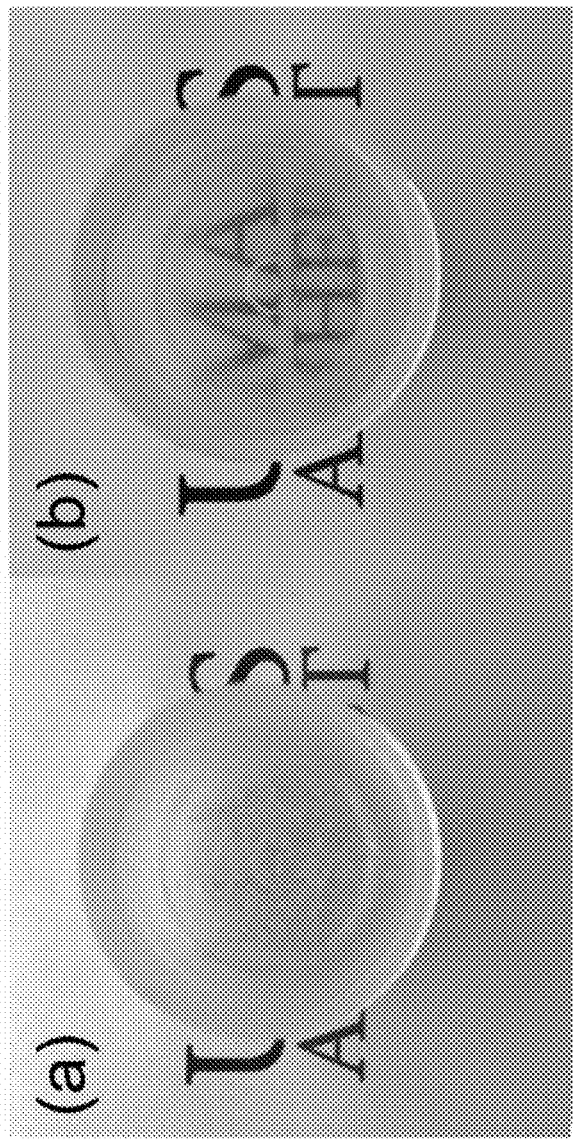
FIG. 5 shows MCM-22(S)/HTPB mixture (a) after 1 minute of limited mixing, and (b) after 36 minutes of extensive mixing.

For exfoliation of the layered zeolite precursors, MCM-22(S) and hydroxyl-terminated polybutadiene (HTPB) were subjected to extensive mixing for 36 minutes. After extensive mixing, the resultant sample transformed from a dispersion of visual aggregates to a transparent solution (FIG. 5b). The (001) diffraction peak disappeared from the SAXS profile of MCM-22(S)/HTPB, indicating exfoliation of MCM-22(S) (FIG. 3a). The (100) diffraction peak, characteristic peak of the MWW framework, remains unaffected after both the swelling and extensive mixing, confirming the retention of the crystalline structure of the zeolite.

The extensive mixing involved use of a planetary mixer (FlackTek SpeedMixer™ DAC 150). The combination of gravitational forces in different planes provided for application of a mixing force and creation of a soft composite mixture. Extensive mixing was achieved by adding four cylindrical ceramic pebbles (h=10.0 mm, r=4.80 mm) into the zeolite/polymer mixture. A rotational speed of 3,000 rpm was used in 2 minute cycles followed by 1 minute of cooling after each cycle.

Figure 6:
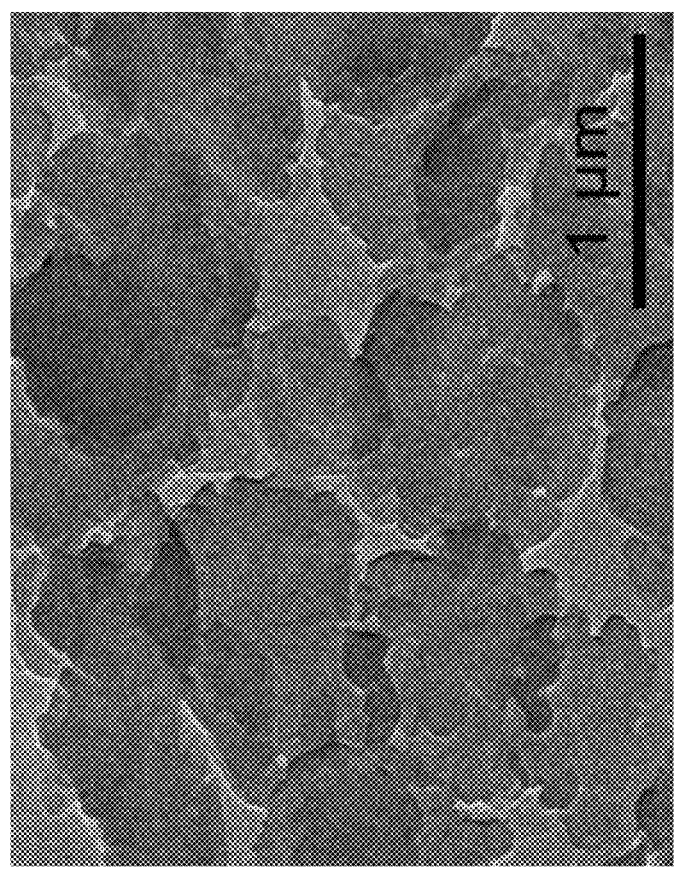
FIG. 6 shows a TEM image showing the presence of partially-exfoliated particles.

The exfoliated MCM-22(S) was dispersed in toluene for further characterization. The TEM images of the solution show the presence of both exfoliated nanosheets and partially exfoliated particles (FIG. 6). The dispersion was then centrifuged to isolate the exfoliated nanosheets from the partially exfoliated ones. After the centrifugation, the supernatant containing the fully exfoliated nanosheets was collected and used for TEM and AFM characterization. The TEM image of the purified solution shows the presence of zeolite nanosheets with a crystalline structure (FIG. 3b). The thickness of the zeolite nanosheets was characterized using AFM which showed a uniform nanosheet thickness of 2.5±0.3 nm (FIGS. 3c and 3d), which is consistent with the previously reported thickness of MWW zeolite nanosheets, suggesting that the zeolite nanosheets have a thickness of a single layer.

Figure 7:
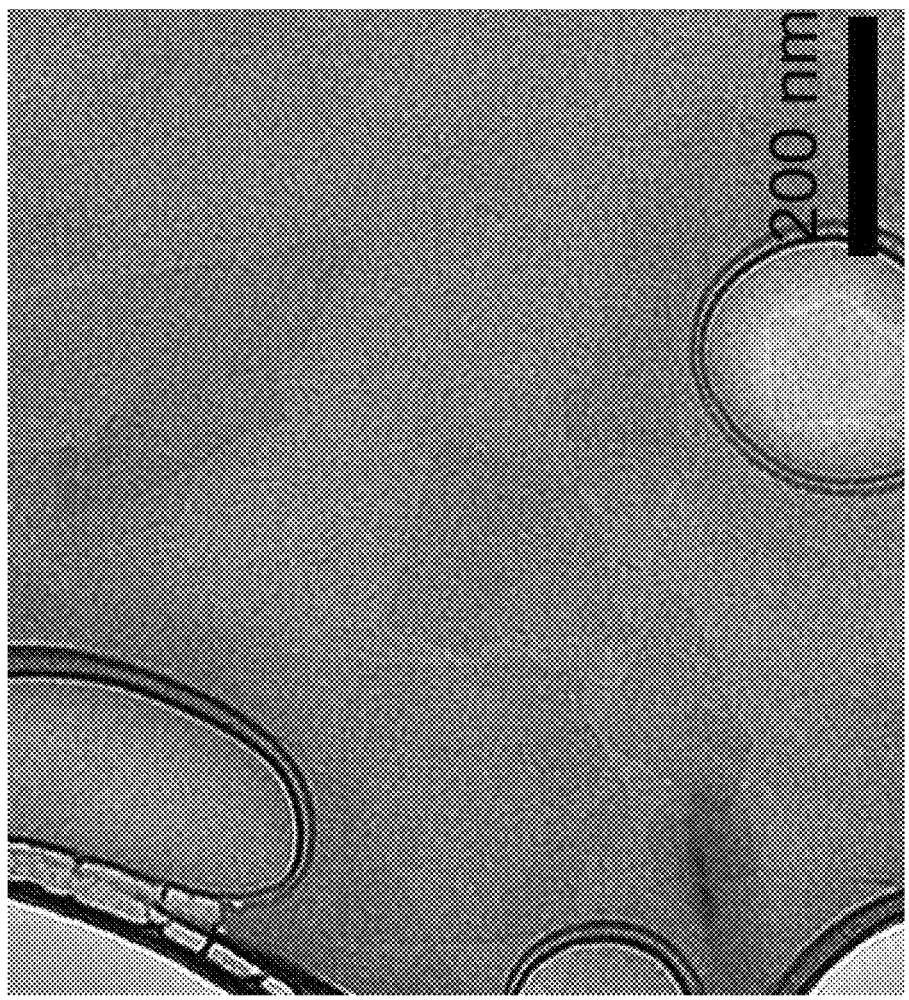
FIG. 7 shows a TEM image of MWW zeolite nanosheets.

FIG. 7 shows a TEM image of MWW zeolite nanosheets. The exfoliated MCM-22(S)/HTPB mixture was dispersed in toluene and further centrifuged. The supernatant was collected and used for TEM imaging.

Figure 8:
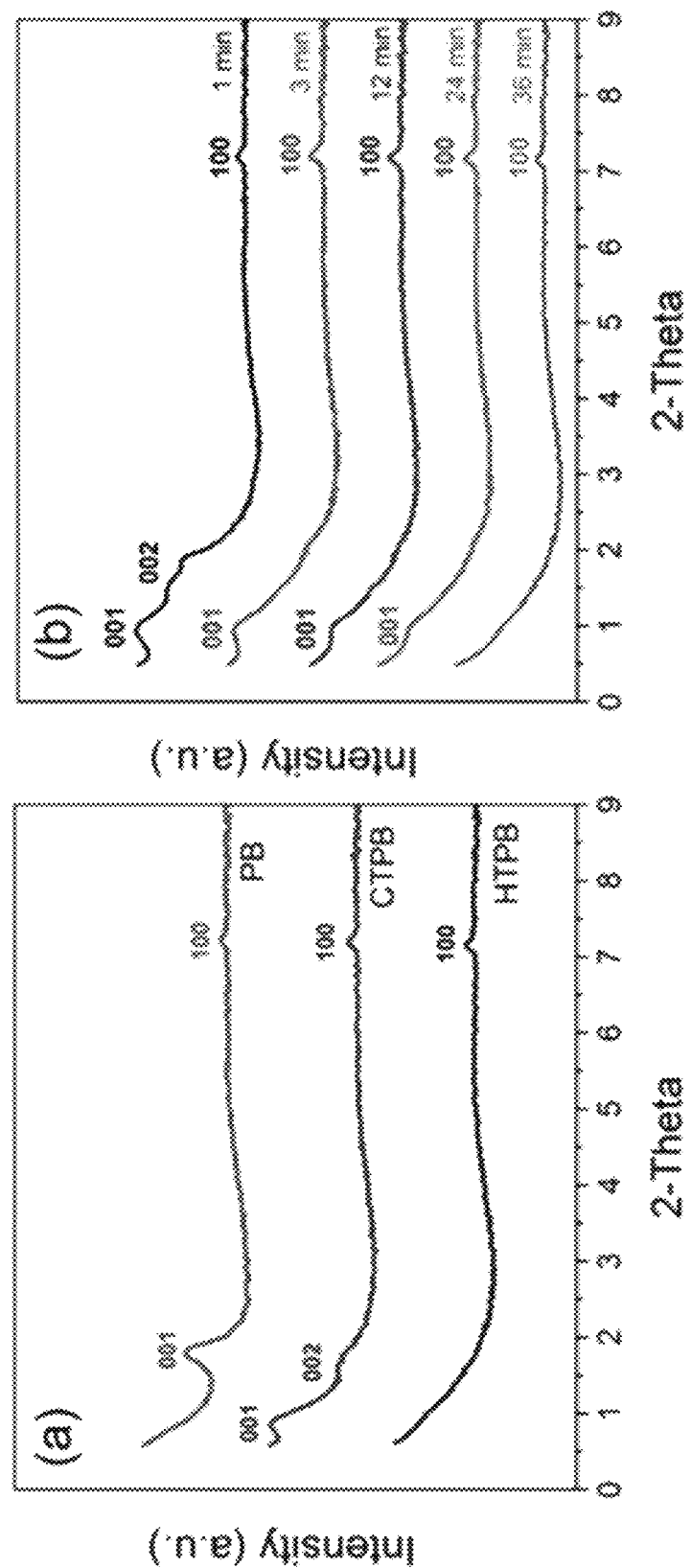
FIG. 8 shows (a) SAXS profiles of mixtures of MCM-22 (S) and polybutadiene (PB), carboxyl-terminated polybutadiene (CTPB), and HTPB after 36 minutes of extensive mixing, and (b) SAXS profiles of a MCM-22(S)/HTPB mixture after 1 minute of limited mixing without extensive mixing and at intermediate durations of extensive mixing, ranging from 3 minutes to 36 minutes.

It was found that the end-groups of the liquid polybutadienes play a role in exfoliation of MCM-22(S). HTPB (hydroxyl group), CTPB (carboxyl group) and PB (nonfunctionalized) were used for exfoliation of MCM-22(S), respectively. SAXS profiles of MCM-22(S)/HTPB, MCM-22(S)/CTPB, and MCM-22(S)/PB after the extensive mixing are shown in FIG. 8a. It was found that PB was relatively ineffective in exfoliating MCM-22(S), whereas CTPB was able to intercalate MCM-22(S) increasing its d-spacing to about 9.8 nm. HTPB was found to be the most effective as evidenced by disappearance of the (001) peak after 36 minutes of extensive mixing. The end-groups of liquid polybutadienes affect both intercalation and exfoliation processes. Without wishing to be bound by any theory, it is believed that the end-groups of polybutadienes affecting both intercalation and exfoliation processes might be due to different interactions between the end-groups of the polymer chain and the polar surface of the zeolite or the organic modifier (i.e., CTAB).

Interactions for intercalation and exfoliation of 2D zeolite precursors include polar interaction between the end-groups of polybutadiene and the head group (trimethylammonium cation, $N(CH_3)_3^+$) of CTAB, and hydrogen bonding formed either between polybutadiene and CTAB or between the end-groups of polybutadiene and the oxygen basal plane as well as silanol groups of the zeolites. Polybutadiene without functional end-groups (i.e., PB) may fail to interact with the zeolite and CTAB, and thus may not contribute to intercalation and exfoliation processes. Both HTPB and CTPB are end-functionalized with polar end groups and thus are able to hydrogen bond, unlike PB. In the case of zeolites, HTPB is more effective than CTPB for exfoliation of MCM-22(S). Without wishing to be bound by any theory, it is believed that such difference in effectiveness may stem from the difference in polarity between hydroxyl and carboxyl end groups, with carboxyl groups having a stronger ability to hydrogen bond, indicating that CTPB interacts more strongly with the head group of CTAB than with the zeolite surface. HTPB, with a less polar end-group, may preferentially interact with the zeolite surface by hydrogen bonding. When the polymer attaches to the zeolite layers, the polymer may push the layers apart effectively, resulting in exfoliation of the zeolites during extensive mixing.

Figure 9:
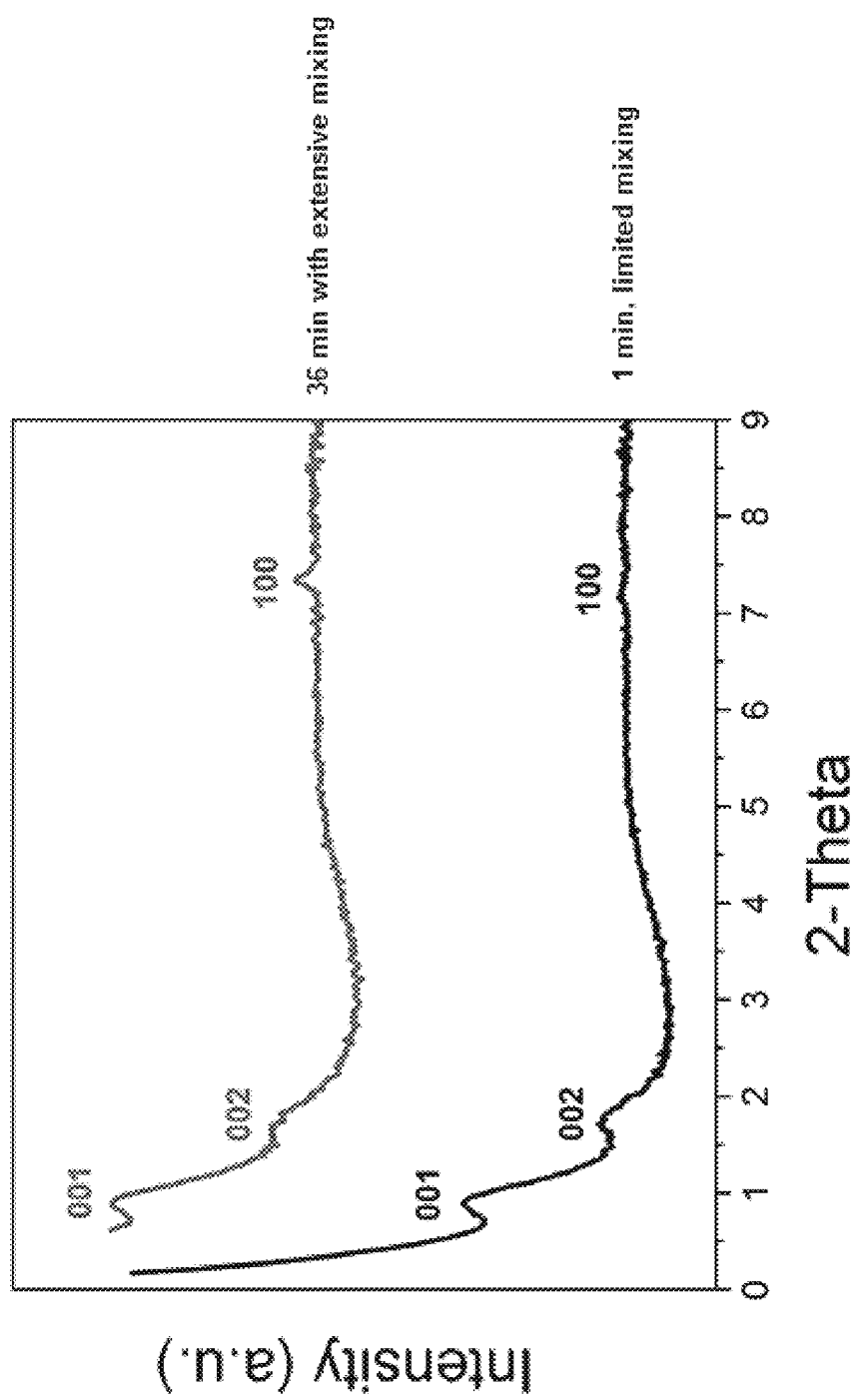
FIG. 9 shows SAXS patterns of MCM-22(S)/CTPB mixture after 1 minute of limited mixing without extensive mixing and after 36 minutes of extensive mixing.

The effect of extensive mixing time on exfoliation was also studied. The SAXS results (FIG. 8b) show a shift of the (001) diffraction peak to a lower angle after limited mixing of MCM-22(S) and HTPB for 1 minute (i.e., without extensive mixing), suggesting that limited mixing is sufficient for intercalation of MCM-22(S) with HTPB, thereby increasing the interlayer d-spacing to about 9.4 nm. Increasing the extensive mixing time leads to a decrease in the intensity of the (001) diffraction peak, resulting in disappearance of the peak at 36 minutes. CTPB may also intercalate MCM-22(S) by limited mixing for 1 minute (FIG. 9), increasing the d-spacing to 9.8 nm. The thickness of MCM-22(S) nanosheets is 2.5 nm, and the interlayer spacing for MCM-22(S) samples after limited mixing with HTPB and CTPB is 6.9 nm and 7.3 nm, respectively. The larger interlayer spacing in the case of CTPB may be due to the larger radius of gyration of CTPB compared to HTPB (Table 1). However, subjecting MCM-22(S)/CTPB to extensive mixing may not further exfoliate the layered structure, confirming a role of the end-groups of the polybutadienes in the exfoliation process.

Radius of Gyration of Polymer and its Effect on Exfoliation $$R_g \cong C_\infty N^{1/2} \qquad (1)$$

Equation (1) may be used to understand the effect of polymer molecular weight on the size and conformation of the polymer, in which $R_g$ is the radius of gyration of the polymer and N is the degree of polymerization.

$$N = \frac{M_n}{M_o} \qquad (2)$$

where $M_n$=Number average molecular weight
$M_O$=Molecular weight of the monomer unit $$\Rightarrow \frac{(R_g)_{CTPB}}{(R_g)_{HTPB}} = \frac{(C_\infty)_{CTPB}}{(C_\infty)_{HTPB}} \frac{(M_n)^{1/2}_{CTPB}}{(M_n)^{1/2}_{HTPB}}$$

Assuming the $C_\infty$ for HTPB and CTPB are the same, $$\frac{(R_g)_{CTPB}}{(R_g)_{HTPB}} = \frac{4200^{1/2}}{2800^{1/2}} = 1.22$$

TABLE 1 d-spacing of MCM-22(S) after processing with various polybutadienes

| Polymer | $M_n$ (g/mol) | d-spacing after 1 minute limited mixing without extensive mixing (nm) | d-spacing after 36 minutes of extensive mixing (nm) |
|---|---|---|---|
| HTPB | 2,800 | 9.4 | Exfoliated |
| CTPB | 4,200 | 9.8 | 9.9 |
| PB | 5,000 | 4.7 | 4.9 |

The interlayer d-spacing of MCM-22(S) powder is 4.6 nm. PB has no end-groups and does not intercalate the zeolite layer. Thus, PB does not change the d-spacing of MCM-22(S), highlighting its inability to intercalate the zeolite.

HTPB and CTPB possess functional end-groups that may intercalate the zeolite after limited mixing. The radius of gyration of CTPB is 1.22 times larger than that of HTPB, and CTPB may increase the d-spacing more (9.8 nm) than HTPB (9.4 nm). After extensive mixing, HTPB is able to exfoliate the zeolite, and CTPB increases the interlayer d-spacing to 9.9 nm with extensive mixing.

Figure 10:
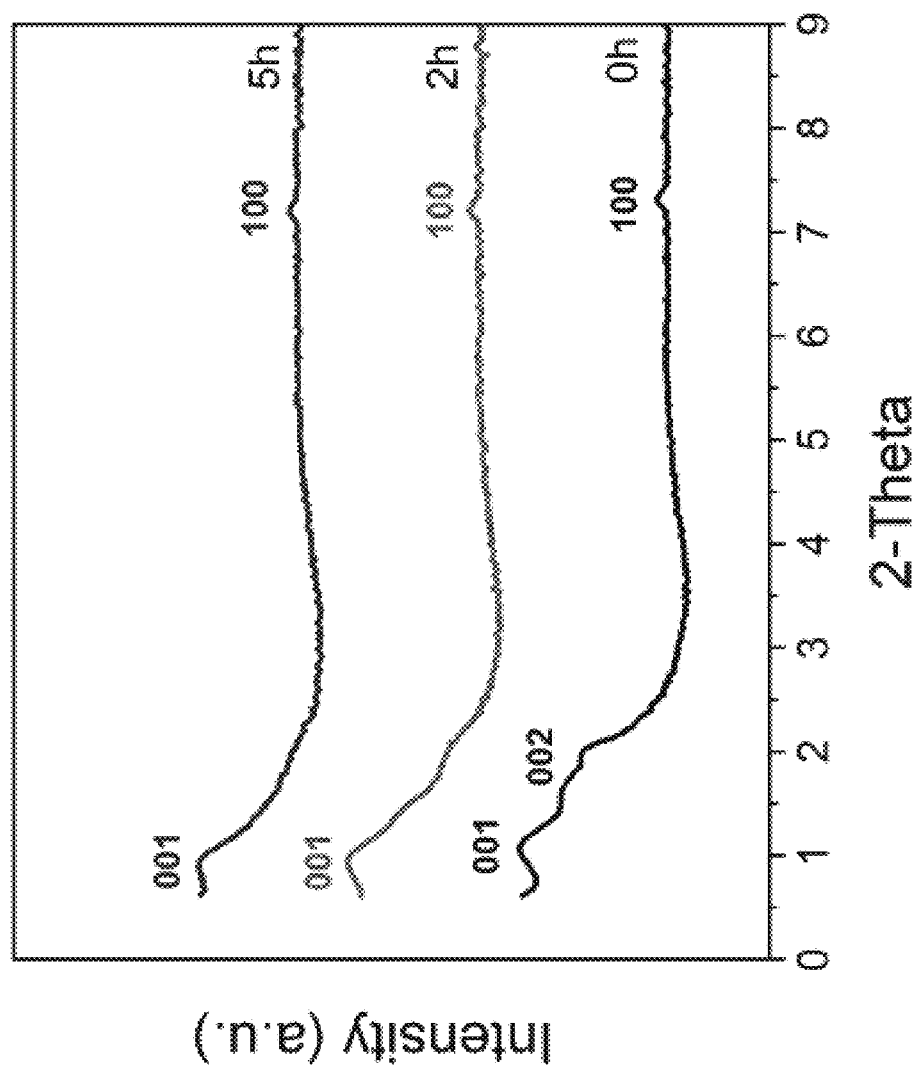
FIG. 10 shows SAXS patterns of MCM-22(S)/HTPB mixture without sonication (0 hours) and of MCM-22(S)/HTPB mixture after 2 and 5 hours of sonication respectively.

To compare the effectiveness of sonication treatment with extensive mixing, 10 weight percent (wt %) of MCM-22(S) and HTPB were subjected to sonication in a bath sonicator. The SAXS results (FIG. 10) reflect a decrease in intensities of the (001) peak and the (002) peak with increasing duration of sonication, suggesting that sonication is effective in exfoliating the layered zeolite precursors, but may require a longer time than extensive mixing. Sonication involved use of a bath sonicator (Branson 3510) at room temperature for different time periods.

Figure 11:
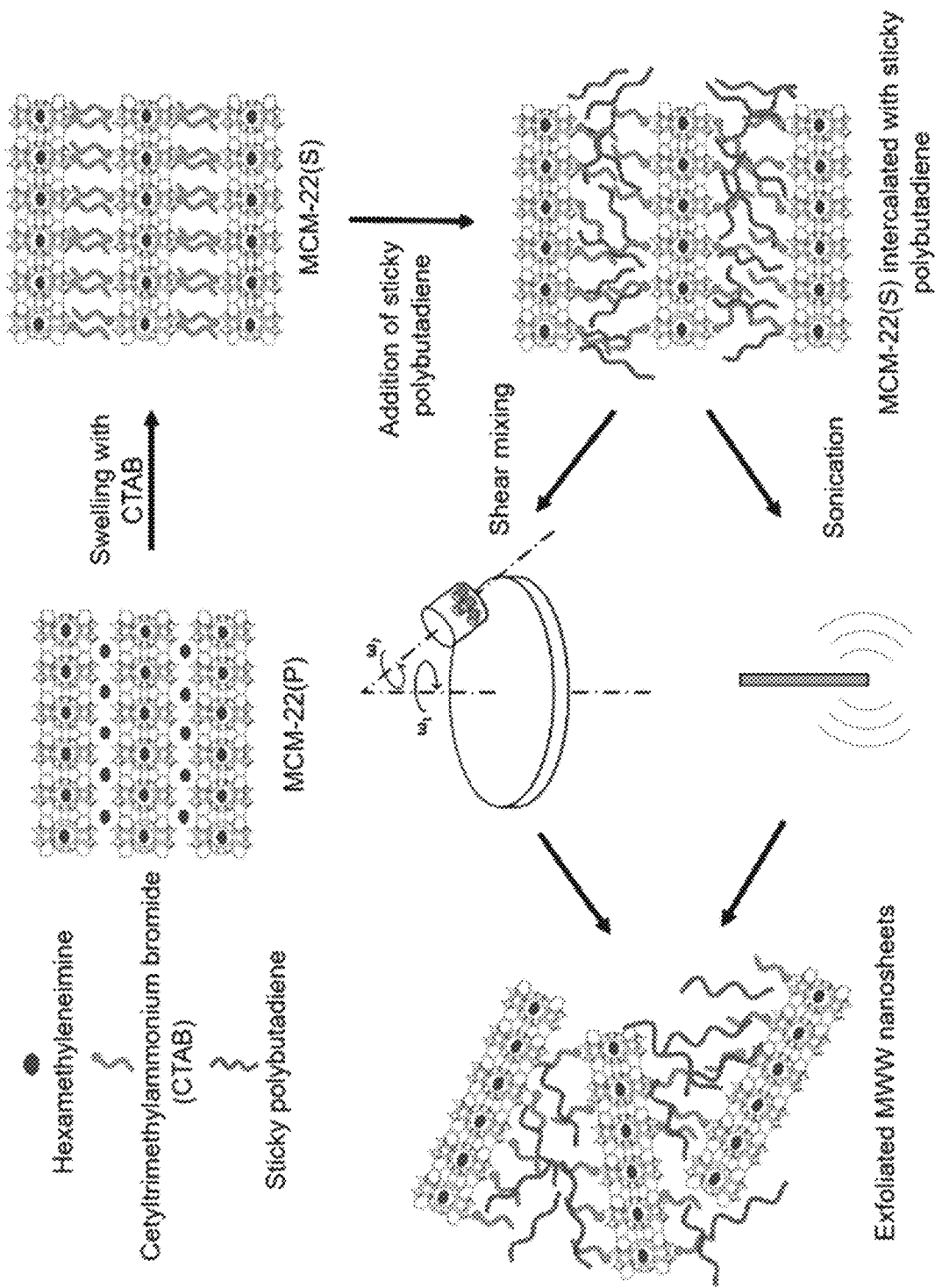
FIG. 11 shows a schematic of an embodiment using telechelic liquid polybutadiene rubber.

An embodiment is summarized in the scheme shown in FIG. 11. MCM-22(P) is a layered zeolite precursor with a MWW framework, having an interlayer d-spacing of 2.7 nm. To increase the interlayer spacing, MCM-22(P) is swollen using CTAB at room temperature. During the swelling process, CTAB molecules diffuse into the interlayer space and increase the interlayer d-spacing to 4.6 nm. For exfoliation of the swollen zeolite precursors, MCM-22(S) is mixed with HTPB. Intercalation of MCM-22(S) is obtained by limited mixing of the solid particles into the polymer, and the interlayer d-spacing is further increased to 9.4 nm.

Other polybutadienes with functional end-groups, such as CTPB, are also active for the intercalation of the zeolite precursors. As noted above, without wishing to be bound by any theory, it is believed that the intercalation may relate to the radius of gyration of the polymers. Additional external energy (extensive mixing or sonication treatment) may be required to exfoliate the layered zeolite precursors. Polybutadiene with a hydroxyl group is more effective than the one with a carboxyl group for exfoliation. Exfoliated MCM-22 nanosheets may be obtained from MCM22(S)/HTPB with extensive mixing for 36 minutes. Sonication may be used for exfoliation, but may require a longer treatment time.

Multilamellar MFI (ml-MFI)

Figure 12:
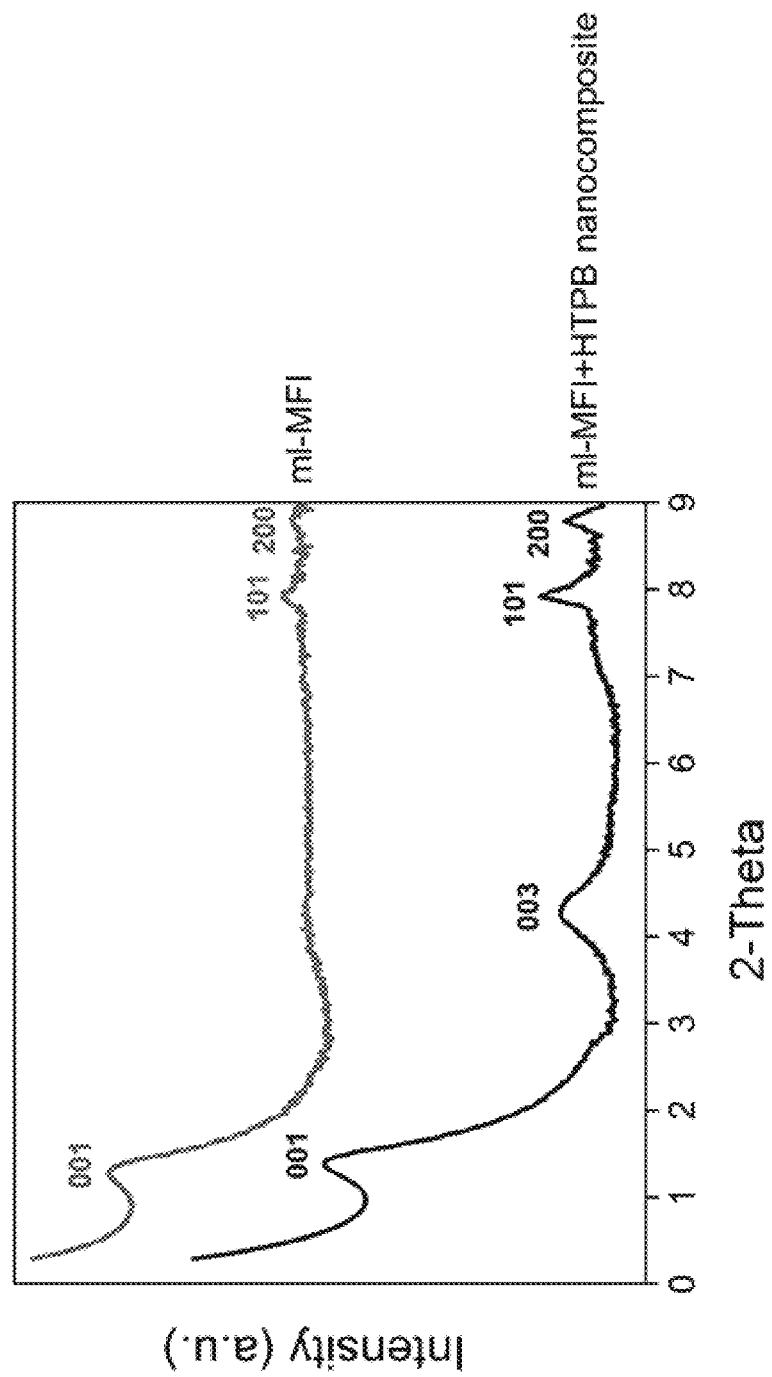
FIG. 12 shows SAXS pattern of multilamellar MFI (ml-MFI) and the ml-MFI/HTPB nanocomposite after 36 minutes of extensive mixing.
Figure 13:
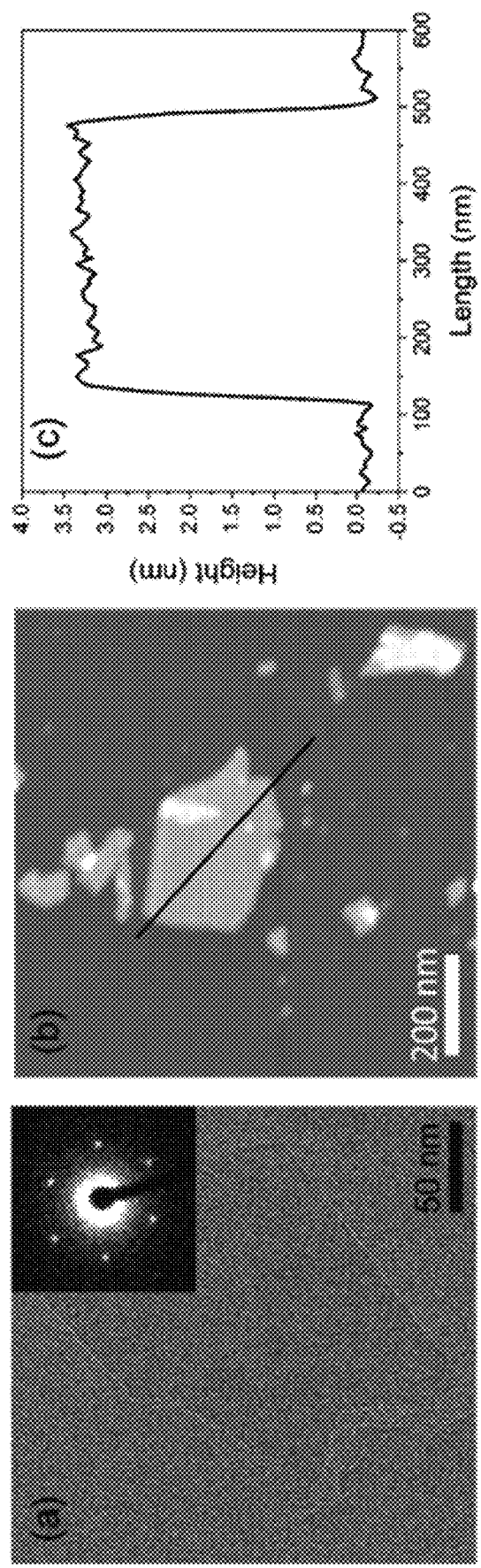
FIG. 13 shows (a) a TEM image of a MFI zeolite nanosheet and the corresponding electron diffraction pattern (inset), (b) an AFM topographic image of MFI zeolite nanosheets, and (c) line profile analysis of the topographic height along the line scan of the MFI zeolite nanosheet shown in (b)

Multilamellar MFI (ml-MFI) was synthesized using $C_{22\text{-}6\text{-}6}(OH)_2$ as an organic structure-directing agent using a reported method (K. Varoon, X. Zhang, B. Elyassi, D. D. Brewer, M. Gettel, S. Kumar, J. A. Lee, S. Maheshwari, A. Mittal, C.-Y. Sung, M. Cococcioni, L. F. Francis, A. V. McCormick, K. A. Mkhoyan and M. Tsapatsis, Science, 2011, 334, 72). A 10 weight percent mixture of ml-MFI and HTPB was subjected to 36 minutes of extensive mixing. The SAXS profile of the ml-MFI(S)/HTPB mixture does not show a disappearance of the (001) diffraction as was observed in the case of MCM-22(S) (FIG. 12), suggesting that a certain amount of ml-MFI was not exfoliated into zeolite nanosheets. Without wishing to be bound by any theory, it believed that some ml-MFI was being exfoliated into zeolite nanosheets may be due to the highly intergrown nature of the ml-MFI material. However, it is possible to separate the exfoliated 2D zeolite nanosheets by centrifugation. The exfoliated ml-MFI mixture was dispersed in toluene and centrifuged to separate the exfoliated zeolite nanosheets from the unexfoliated ones. The supernatant containing the exfoliated zeolite nanosheets was collected and used for TEM imaging. TEM characterization and the selected area electron diffraction pattern show the presence of MFI zeolite nanosheets with high crystallinity (FIG. 13). The thickness of the zeolite nanosheets was characterized using AFM which showed a uniform nanosheet thickness of 3.4±0.2 nm (FIGS. 13b and 13c), which is consistent with the previously reported thickness of single-layered MFI zeolite nanosheets which are 1.5 unit cells thick.

Exfoliation of 2D zeolite precursors including MCM-22 (S) and ml-MFI into zeolite nanosheets may be achieved by suspending the layered zeolite precursors in a telechelic liquid polybutadiene (HTPB), followed by extensive mixing and/or sonication at room temperature. End-groups on the polybutadienes play a role in the exfoliation process. Non-functionalized polybutadiene is ineffective in intercalation and exfoliation of the layered zeolite precursors. CTPB, carboxyl-terminated polybutadiene, is active for intercalation, but less effective for exfoliation than the hydroxyl-terminated polybutadiene, HTPB. Without wishing to be bound by any theory, it is believed that the relative effectiveness of CTPB and HTPB is due to the different interactions between the polybutadienes and the swollen zeolites with organic molecules.

Figure 14:
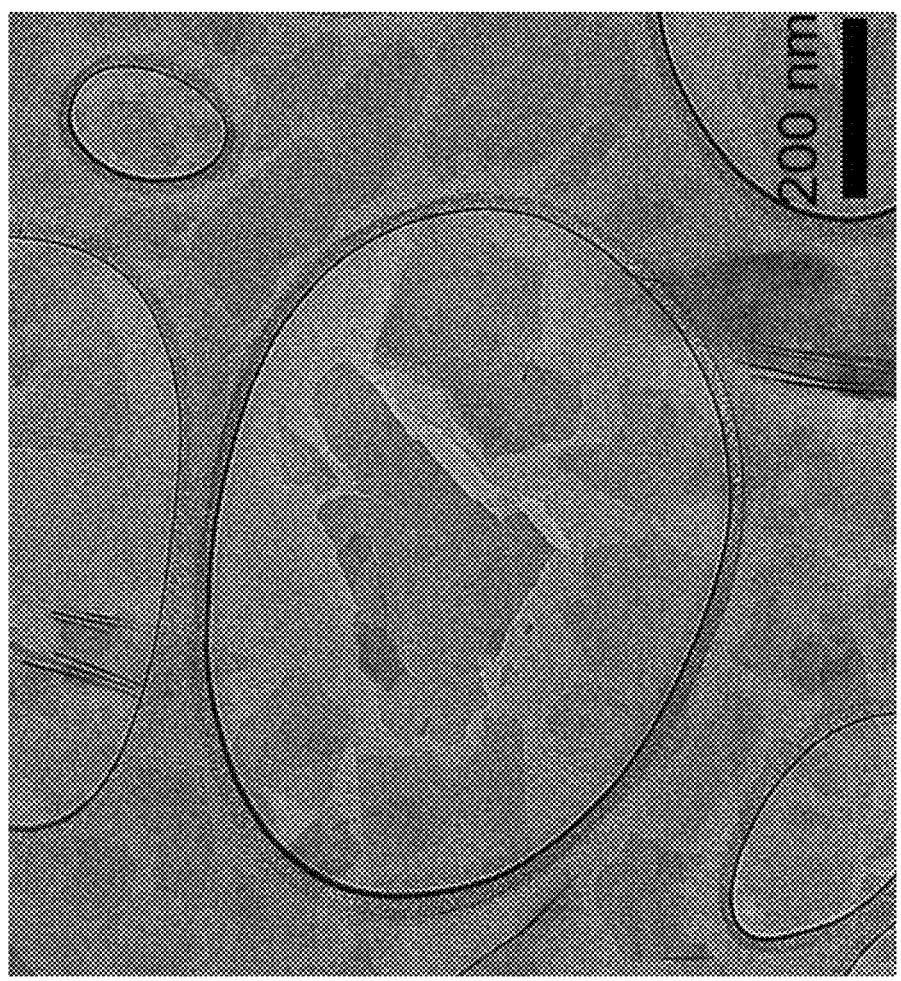
FIG. 14 shows a TEM image of MFI zeolite nanosheets.

FIG. 14 shows a TEM image of MFI zeolite nanosheets. The exfoliated ml-MFI/HTPB mixture was dispersed in toluene and further centrifuged. The supernatant was collected and used for TEM imaging;

ITQ-1

ITQ-1 precursor (ITQ-1(P)) was synthesized using a reported method (M. A. Camblor, A. Corma and M. Diaz-Cabanas, J. Phys. Chem. B, 1998, 102, 44-51). 0.389 grams (g) of sodium chloride (obtained from Fisher) was dissolved in 21.12 g of distilled water. 7.04 g of 25 wt % aqueous solution of trimethyladamantylammonium hydroxide (TMAdaOH) (obtained from SACHEM Inc.), 1.024 g of HMI (obtained from Sigma Aldrich) and 2.0 g of fumed silica (Cab-O-Sil M5) were then added to the mixture. The resulting gel composition was $SiO_2$: 0.25 TMAdaOH: 0.31HMI: 0.20NaCl: $44H_2O$. The mixture was stirred at room temperature for 5 hours, followed by hydrothermal synthesis in a Teflon-lined stainless steel autoclave with a rotation of 16 revolutions per minutes (rpm) at 150° C. for 11 days. The obtained crystalline product was collected by centrifugation and repeatedly washing with distilled water until the pH of the supernatant solution was reduced to 9.

ITQ-1(P) was swollen with CTAB at room temperature following a reported procedure (S. Maheshwari, E. Jordan, S. Kumar, F. S. Bates, R. L. Penn, D. F. Shantz and M. Tsapatsis, J. Am. Chem. Soc., 2008, 130, 1507-1516). 9.0 g of aqueous slurry of ITQ-1(P) (20 wt % solids), 35.0 g of an aqueous solution of 29 wt % CTAB (obtained from Research Organics Inc.), and 11.0 g of an aqueous solution of 40 wt % tetrapropyl ammonium hydroxide (obtained from Alfa Aesar) was stirred at room temperature for 16 hours. The particles were then recovered by 15 cycles of centrifugation and washing with distilled water so that the pH of the supernatant solution was gradually reduced to 9. The resulting swollen material, ITQ-1(S), was dried overnight in an oven at 70° C.

HTPB (Average Mn=2,800 grams per mol (g/mol)), obtained from Sigma Aldrich, was used for exfoliation of ITQ-1(S). 10 wt % ITQ-1(S) was added to HTPB and limited mixing was conducted for 1 minute using a spatula.

Small-angle X-ray (SAXS) scattering data was obtained using a SAXSLAB's Ganesha instrument with a Cu-Kα radiation source and a sample-to-detector distance of 441 millimeters (mm). Powder X-ray diffraction patterns were collected on a PANalytical X'Pert Pro instrument with a Cu-Kα radiation source in the 2θ range of 4° to 32°. TEM images of the zeolite nanosheets were obtained using a JEOL JEM-2200FS instrument operated at 200 kilovolts (kV). 0.3 g of the zeolite/polybutadiene mixture after exfoliation was dissolved in 5 mL of toluene, and centrifuged for 10 minutes at 6,000 rpm. The supernatant was collected for the TEM observation. To prepare the TEM samples, a drop of the supernatant was deposited on a copper grid (Lacey carbon film, Cu 300 mesh, Electron Microscopy Sciences), and dried in air. SEM images were collected using FEI Magellan 400 XHR-SEM operated at 3.0 kV. The samples were sputter-coated with platinum before imaging. AFM measurements on the zeolite nanosheets were performed on an Asylum Research Cypher ES (Oxford instruments) using a non-contact cantilever (BudgetSensors Tap300A1-G; k=40 N/m, f=300 kilohertz (kHz)) in tapping mode. To prepare the samples, a drop of the zeolite nanosheet suspension in toluene was deposited on a mica disc (MTI Corporation, 9.9 mm diameter). The polymer was removed from the sample by calcining at 540° C. for 6 hours in air flow with a flow rate of 472 milliliters per minute (mL/min).

Figure 15:
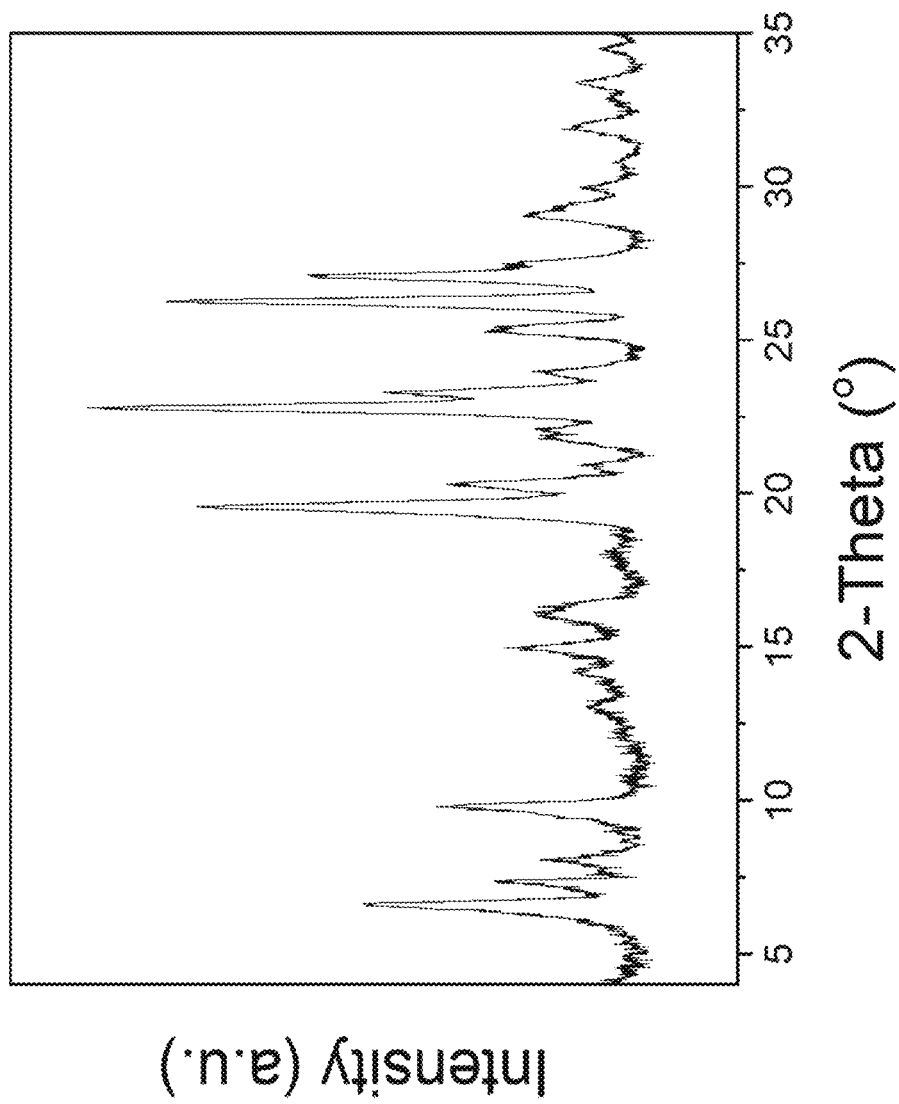
FIG. 15 shows an XRD pattern of ITQ-1 precursor (ITQ-1(P))
Figure 16:
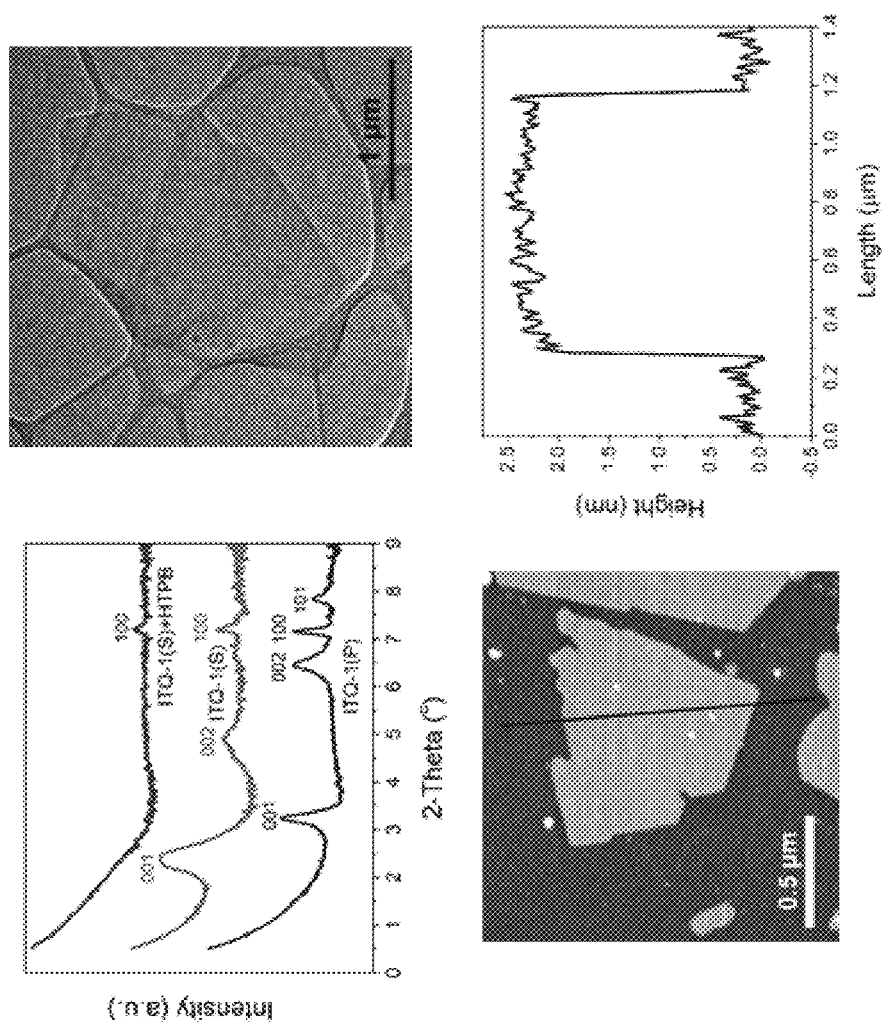

The XRD pattern of the synthesized sample the characteristic diffraction peaks of the MWW framework previously reported, suggesting that a highly crystalline ITQ-1(P) was obtained (FIG. 15). The SAXS pattern of the synthesized ITQ-1(P) shows (001) and (002) diffraction peaks indicating that the material exhibits a layered structure (FIG. 16a). During swelling, the CTAB molecules diffuse into the inter-layer spacing of ITQ-1(P), increasing the spacing. The SAXS pattern, which shows a shift of the (001) peak to a lower angle, suggests an increase in the d-spacing to 3.7 nm. An SEM image of ITQ-1(S) also depicts the presence of layers (FIG. 17).

For exfoliation of the layered precursor, limited mixing of ITQ-1(S) and HTPB was conducted for 1 minute, after which the (001) diffraction peak disappeared from the SAXS profile (FIG. 16a), indicating successful exfoliation. The (100) diffraction peak, characteristic of the MWW framework, remains unaffected in both swollen and exfoliated sample, confirming the retention of the crystalline structure of the zeolite.

The exfoliated ITQ-1(S)/HTPB mixture was dispersed in toluene and centrifuged to separate the exfoliated nanosheets from the partially exfoliated ones. After the centrifugation, the supernatant containing the exfoliated nanosheets was collected and used for TEM and AFM characterization. TEM images show the presence of large (1 μm×1 μm and greater) exfoliated nanosheets (FIG. 16b). An HRTEM image of a zeolite nanosheet shows the 6 MR apertures as bright spots (FIG. 18). The thickness of the zeolite nanosheets was characterized using AFM, which showed a uniform thickness of 2.4±0.2 nm (FIGS. 16c and 16d), which is consistent with the reported thickness of MWW zeolite nanosheets, suggesting that the zeolite nanosheets have a thickness of single layer.

MCM-22(S) and ITQ-1(S) show different exfoliation behavior. Upon limited mixing with HTPB, ITQ-1(S) may exfoliate without extensive mixing, whereas MCM-22(S) may get intercalated without extensive mixing and may require extensive mixing for exfoliation (FIG. 19).

The dynamic moduli from the repeated frequency sweeps are shown as a function of time for both MCM-22 (FIG. 16a) and ITQ-1 (FIG. 16b). An initial sharp growth in modulus is seen, indicating indicates an initial fast development in structure while being kept at room temperature. After approximately 1.5 hours, a leveling in modulus is seen (as a function of time) indicating a steady-state has been reached.

ITQ-1(S) may be exfoliated without extensive mixing, which may reduce the possibility of size-reduction of the zeolite nanosheets, resulting into relatively large exfoliated nanosheets. The zeolite nanosheets obtained by exfoliation of MCM-22(S) are reduced in size, for example, due to extensive mixing (see FIG. 20, which shows SEM images and a comparison of the size of nanosheets obtained by exfoliation of (a) MCM-22(S) and (b) ITQ-1(S)).

ITQ-1-Al(P)

0.35 g of sodium chloride (Fisher) and 0.054 g of sodium aluminate (obtained from Sigma Aldrich) was dissolved in 21.12 g of distilled water. 7.04 g of 25 wt % aqueous solution of TMAdaOH (obtained from SACHEM Inc.), 1.024 g of HMI (obtained from Sigma Aldrich) and 2.0 g of fumed silica (Cab-O-Sil M5) were then added to the mixture. The resulting gel composition was $SiO_2$: 0.25TMAd-aOH: 0.31HMI: 0.20NaCl: $44H_2O$. The mixture was stirred at room temperature for 5 hours, followed by hydrothermal synthesis in a Teflon-lined stainless steel autoclave with a rotation of 16 rpm at 150° C. for 11 days. The obtained crystalline product was collected by centrifugation and repeatedly washing with distilled water until the pH of the supernatant solution was reduced to 9.

ITQ-1-Al(P) was swollen following the same procedure as ITQ-1(P).

After limited mixing of ITQ-1-Al(S) and HTPB for 1 minute, the (001) peak shifts to a lower angle with a reduced intensity (FIG. 21), indicating that the presence of TMAd-aOH in the interlayer spacing is favorable for exfoliation. FIG. 21 shows SAXS profiles of ITQ-1-Al(P), ITQ-1-Al(S), ITQ-1-Al(S)/HTPB mixture after 1 minute of limited mixing. The (001) diffraction peak did not completely disappear from the SAXS profile of ITQ-1-Al(S)/HTPB, suggesting that a certain amount of ITQ-1-Al was not exfoliated into zeolite nanosheets.

This disclosure further encompasses the following aspects.

Aspect 1. A method for forming zeolite nanosheets, the method comprising: forming a mixture comprising a layered zeolite precursor and a telechelic polybutadiene; and exfoliating the layered zeolite precursor to provide the zeolite nanosheets.

Aspect 2. The method of Aspect 1, further comprising swelling the layered zeolite precursor prior to forming the mixture.

Aspect 3. The method of Aspect 2, wherein swelling the layered zeolite precursor comprises mixing the layered zeolite precursor with a cationic surfactant, preferably an ammonium surfactant of the formula $R_3R'N^+X^-$ wherein each R is independently a C1-4 alkyl, R' is a $C_{8-36}$ alkyl or cycloalkyl, and X is a counterion, more preferably cetyltrimethyl ammonium bromide.

Aspect 4. The method of Aspect 3, wherein the cationic surfactant comprises behentrimonium chloride, benzalkonium chloride, benzethonium chloride, benzododecinium bromide, bronidox, carbethopendecinium bromide, cetalkonium chloride, cetrimonium bromide, cetrimonium chloride, cetylpyridinium chloride, didecyldimethylammonium chloride, dimethyldioctadecylammonium bromide, dimethyldioctadecylammonium chloride, domiphen bromide, lauryl methyl gluceth-10 hydroxypropyl dimonium chloride, octenidine dihydrochloride, olaflur, N-oleyl-1,3-propanediamine, pahutoxin, stearalkonium chloride, thonzonium bromide, or a combination thereof.

Aspect 5. The method of any one or more of the preceding aspects, wherein the layered zeolite precursor comprises MCM-22 precursor.

Aspect 6. The method of any one or more of Aspects 1-4, wherein the layered zeolite precursor comprises multilamellar Aspect 7. The method of any one or more of Aspects 1-4, wherein the layered zeolite precursor comprises ITQ-1 precursor.

Aspect 8. The method of any one or more of Aspects 1-4, wherein the layered zeolite precursor does not comprise aluminum.

Aspect 9. The method of any one or more of the preceding Aspects, wherein the functionalized polymer comprises a hemitelic polymer, a di-end-functional polymer, a telechelic polymer, a random polymer, a block polymer, or a combination thereof.

Aspect 10. The method of any one or more of the preceding aspects, wherein the functionalized polymer comprises a telechelic polybutadiene.

Aspect 11. The method of Aspect 10, wherein the telechelic polybutadiene comprises hydroxyl-terminated polybutadiene.

Aspect 12. The method of Aspect 10, wherein the telechelic polybutadiene comprises carboxyl-terminated polybutadiene.

Aspect 13. The method of any one or more of the preceding aspects, wherein exfoliating the layered zeolite precursor comprises applying a dispersion force to the mixture.

Aspect 14. The method of Aspect 13, wherein the dispersion force is applied to the mixture at a temperature below 100° C.

Aspect 15. The method of Aspect 13 or Aspect 14, wherein applying the dispersion force comprises extensive mixing for a period of time less than 100 minutes.

Aspect 16. The method of Aspect 13 or Aspect 14, wherein applying the dispersion force comprises sonication for a period of time less than 100 minutes.

Aspect 17. The method of any one or more of the preceding aspects, wherein exfoliating the layered zeolite precursor comprises limited mixing of the mixture.

Aspect 18. The method of Aspect 17, wherein the limited mixing is conducted for a period of time less than 5 minutes.

Aspect 19. The method of Aspect 17 or Aspect 18, wherein the mixture is at a temperature below 100° C. during the limited mixing.

Aspect 20. The method of any one or more of the preceding aspects, wherein the layered zeolite precursor is prepared with an organic structure directing agent, preferably tetrapropylammonium, 2-ethyl-1,3,4-trimethylimidazolium, trimethyladamantammonium, hexamethyleneimine, hexamethonium, tetrabutylammonium, or a combination thereof, more preferably hexamethyleneimine.

Aspect 21. The method of any one or more of Aspects 1-18, wherein the layered zeolite precursor is prepared with hexamethyleneimine and trimethyladamantammonium hydroxide.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combinations" is inclusive of blends, mixtures, alloys, reaction products, and the like. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an embodiment" means that a particular element described in connection with the embodiment is included in at least one embodiment described herein, and may or may not be present in other embodiments. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for forming zeolite nanosheets, the method comprising:
    forming a mixture comprising a layered zeolite precursor and a functionalized polymer; and
    exfoliating the layered zeolite precursor to provide the zeolite nanosheets.

2. The method of claim 1, further comprising swelling the layered zeolite precursor prior to forming the mixture.

3. The method of claim 2, wherein swelling the layered zeolite precursor comprises mixing the layered zeolite precursor with a cationic surfactant.

4. The method of claim 3, wherein the cationic surfactant comprises behentrimonium chloride, benzalkonium chloride, benzethonium chloride, benzododecinium bromide, bronidox, carbethopendecinium bromide, cetalkonium chloride, cetrimonium bromide, cetrimonium chloride, cetyltrimethyl ammonium bromide, didecyldimethylammonium chloride, dimethyldioctadecylammonium bromide, dimethyldioctadecylammonium chloride, domiphen bromide, lauryl methyl gluceth-10 hydroxypropyl dimonium chloride, octenidine dihydrochloride, olaflur, N-oleyl-1,3-propanediamine, pahutoxin, stearalkonium chloride, thonzonium bromide, or a combination thereof.

5. The method of claim 1, wherein the layered zeolite precursor comprises MCM-22 precursor.

6. The method of claim 1, wherein the layered zeolite precursor comprises multilamellar MFI.

7. The method of claim 1, wherein the layered zeolite precursor comprises ITQ-1 precursor.

8. The method of claim 1, wherein the layered zeolite precursor does not comprise aluminum.

9. The method of claim 1, wherein the functionalized polymer comprises a hemitelic polymer, a di-end-functional polymer, a telechelic polymer, a random polymer, a block polymer, or a combination thereof.

10. The method of claim 1, wherein the functionalized polymer comprises a telechelic polybutadiene.

11. The method of claim 10, wherein the telechelic polybutadiene comprises hydroxyl-terminated polybutadiene.

12. The method of claim 11, wherein the telechelic polybutadiene comprises carboxyl-terminated polybutadiene.

13. The method of claim 1, wherein exfoliating the layered zeolite precursor comprises applying a dispersion force to the mixture.

14. The method of claim 13, wherein the dispersion force is applied to the mixture at a temperature below 100° C.

15. The method of claim 13, wherein applying the dispersion force comprises mixing for a period of time less than 100 minutes.

16. The method of claim 13, wherein applying the dispersion force comprises sonication for a period of time less than 100 minutes.

17. The method of claim 1, wherein exfoliating the layered zeolite precursor comprises mixing of the mixture.

18. The method of claim 15, wherein the mixing is conducted for a period of time less than 5 minutes.

19. The method of claim 15, wherein the mixture is at a temperature below 100° C. during the mixing.

20. The method of claim 1, wherein the layered zeolite precursor is prepared with an organic structure directing agent, selected from tetrapropylammonium, 2-ethyl-1,3,4-trimethylimidazolium, trimethyladamantammonium, hexamethyleneimine, hexamethonium, tetrabutylammonium, or a combination thereof.

21. The method of claim 1, wherein the layered zeolite precursor is prepared with hexamethyleneimine and trimethyladamantammonium hydroxide.

* * * * *